(12) United States Patent
Takanashi

(10) Patent No.: US 9,473,679 B2
(45) Date of Patent: Oct. 18, 2016

(54) IMAGING APPARATUS AND METHOD FOR CONTROLLING THE SAME, AND LENS UNIT

(71) Applicant: CANON KABUSHIKI KAISHA, Tokyo (JP)

(72) Inventor: Hideya Takanashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/023,264

(22) Filed: Sep. 10, 2013

(65) Prior Publication Data

US 2014/0071336 A1    Mar. 13, 2014

(30) Foreign Application Priority Data

Sep. 12, 2012 (JP) .................................. 2012-200298

(51) Int. Cl.
- H04N 5/217 (2011.01)
- H04N 5/232 (2006.01)
- G03B 17/14 (2006.01)

(52) U.S. Cl.
CPC ............. *H04N 5/217* (2013.01); *G03B 17/14* (2013.01); *H04N 5/23209* (2013.01); *G03B 2206/00* (2013.01)

(58) Field of Classification Search
None
See application file for complete search history.

(56) References Cited

U.S. PATENT DOCUMENTS

2002/0121652 A1* 9/2002 Yamasaki ..................... 257/222
2008/0199170 A1* 8/2008 Shibuno et al. .............. 396/125

FOREIGN PATENT DOCUMENTS

| CN | 101256334 A | 9/2008 |
|---|---|---|
| CN | 101285986 A | 10/2008 |
| CN | 102027411 A | 4/2011 |
| JP | 2005-286482 A | 10/2005 |
| JP | 2009-251492 A | 10/2009 |
| JP | 2010-109667 A | 5/2010 |
| WO | 2009/139118 A1 | 11/2009 |

* cited by examiner

*Primary Examiner* — Mark Monk
(74) *Attorney, Agent, or Firm* — Canon U.S.A., Inc. IP Division

(57) ABSTRACT

In an imaging apparatus including a reset instruction unit configured to instruct a lens unit to reset an optical member thereof, a first communication system is used for communication for acquiring individual information of the lens unit, and a second communication system different from the first communication system is used for communication for instructing the lens unit to reset an optical member by a reset instruction unit.

11 Claims, 21 Drawing Sheets

CHARACTERISTIC OF LIGHT FALLOFF AT EDGES AT PHOTOGRAPHING MAGNIFICATION m

CHARACTERISTIC OF LIGHT FALLOFF AT EDGES AT PHOTOGRAPHING MAGNIFICATION n

CORRECTION RESULT OF LIGHT FALLOFF AT EDGES AT PHOTOGRAPHING MAGNIFICATION m

CORRECTION RESULT OF LIGHT FALLOFF AT EDGES AT PHOTOGRAPHING MAGNIFICATION n

FIG.9A
CORRECTION DATA STRUCTURE OF LENS TYPE 1

ADDRESS INFORMATION:
- CORRECTION VALUE ADDRESS OF OptInfo1[0]-OptInfo2[0]-OptInfo3[0]
- CORRECTION VALUE ADDRESS OF OptInfo1[0]-OptInfo2[0]-OptInfo3[1]
- CORRECTION VALUE ADDRESS OF OptInfo1[0]-OptInfo2[0]-OptInfo3[2]
- ⋮
- ⋮
- CORRECTION VALUE ADDRESS OF OptInfo1[1]-OptInfo2[0]-OptInfo3[0]
- CORRECTION VALUE ADDRESS OF OptInfo1[1]-OptInfo2[0]-OptInfo3[1]
- ⋮
- ⋮

CORRECTION VALUES:
- CORRECTION VALUE OF OptInfo1[0]-OptInfo2[0]-OptInfo3[0]
- CORRECTION VALUE OF OptInfo1[0]-OptInfo2[0]-OptInfo3[1]
- CORRECTION VALUE OF OptInfo1[0]-OptInfo2[0]-OptInfo3[2]
- ⋮
- ⋮
- CORRECTION VALUE OF OptInfo1[1]-OptInfo2[0]-OptInfo3[0]
- CORRECTION VALUE OF OptInfo1[1]-OptInfo2[0]-OptInfo3[1]
- ⋮
- ⋮

CHARACTERISTIC OF
LIGHT FALLOFF AT EDGES
AT PHOTOGRAPHING
MAGNIFICATION m

CHARACTERISTIC OF
LIGHT FALLOFF AT EDGES
AT PHOTOGRAPHING
MAGNIFICATION n

CORRECTION RESULT OF
LIGHT FALLOFF AT EDGES
AT PHOTOGRAPHING
MAGNIFICATION m

CORRECTION RESULT OF
LIGHT FALLOFF AT EDGES
AT PHOTOGRAPHING
MAGNIFICATION n

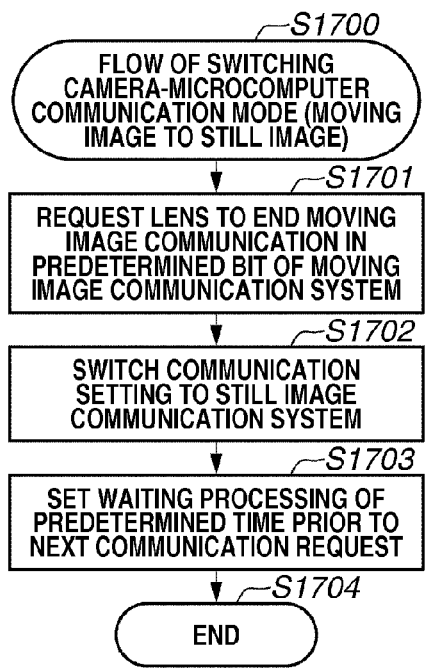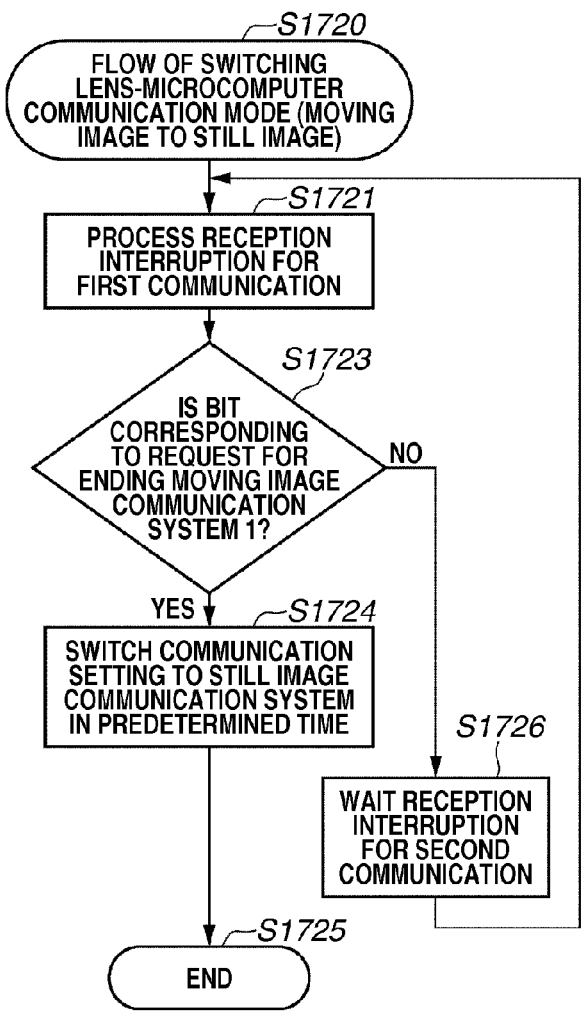

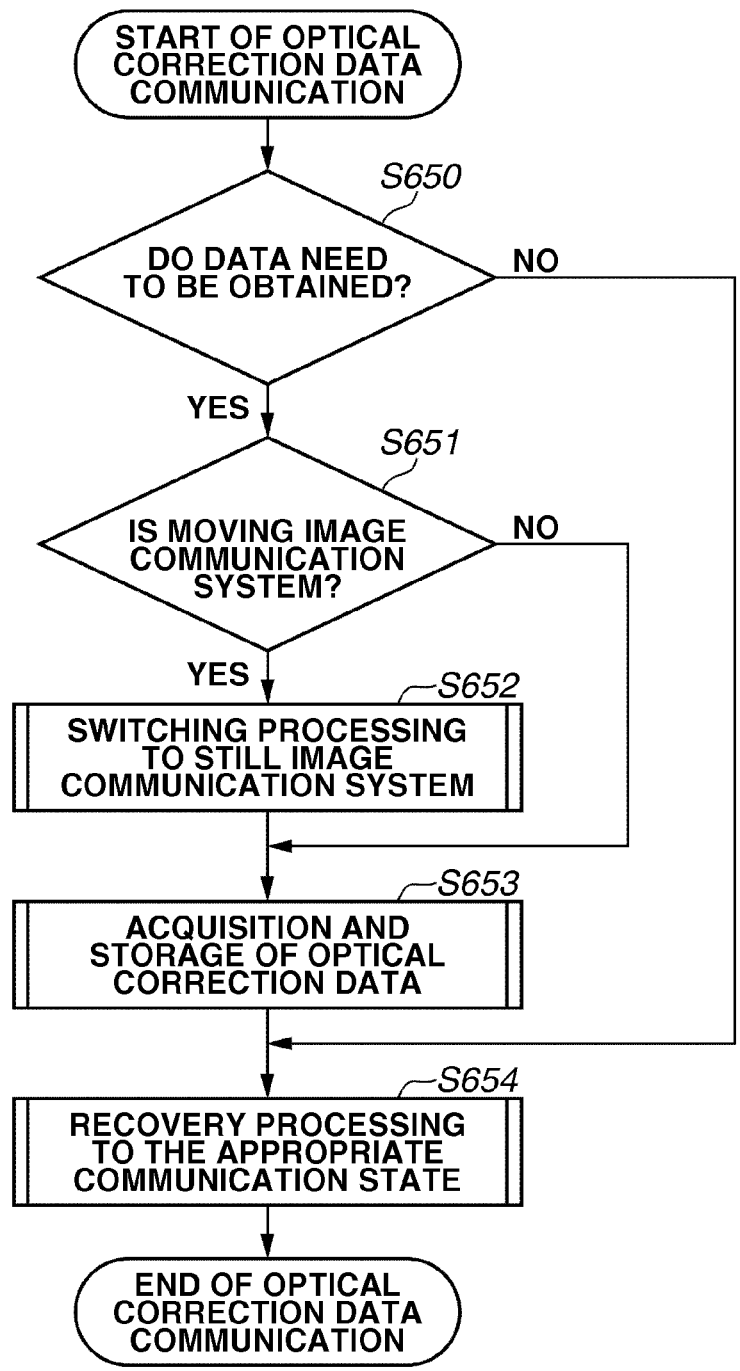

IMAGING APPARATUS AND METHOD FOR CONTROLLING THE SAME, AND LENS UNIT

BACKGROUND OF THE INVENTION

1. Field of the Invention

The present invention relates to an imaging apparatus with an interchangeable lens unit and a method for controlling the same, and, in particular, to a communication system optimum for each type of a lens unit to be attached and each function of the lens unit, and to a technique whereby to correct image degradation resulting from optical characteristics of the lens unit.

The present invention also relates to a communication processing between a camera and a lens unit suited for correction of image degradation resulting from optical characteristics of the lens unit, and to the lens unit.

2. Description of the Related Art

An imaging apparatus such as a digital camera and a digital video camera is always required to have a high-quality output image. This also holds true of the digital camera and the digital video camera which are provided with an interchangeable lens unit.

Along with that, a control technique for the lens unit has been more and more complicated. For example, an initial positioning for a focus mechanism and a diaphragm mechanism, which form the lens unit, is made to perform high-accuracy control. Also as an example, there is a mechanism for correcting an optical characteristic, which is one of factors degrading image quality, of the lens unit used for capturing an object image. A light falloff at edges, distortion aberration, and chromatic aberration of magnification are cited as examples of the optical characteristic causing image degradation. It is difficult to realize a lens unit completely eliminating the above factors. For this reason, a technique is known in which a captured image is subjected to image processing to correct image degradation caused by the optical characteristic (an optical correction technique).

Even the same lens unit changes in its optical characteristic depending on values of optical parameters, such as a focal length (angle of view of a zoom lens), a photographing distance (a focusing distance) and an aperture value. Therefore, if the image degradation caused by the optical characteristic is corrected by the image processing, an optical correction value corresponding to the optical parameter in capturing an image needs to be used to accurately correct the image degradation.

Japanese Patent Application Laid-Open No. 2005-286482 discusses a method for determining an optical correction quantity based on a polynomial approximate equation obtained from transition of a distortion correction quantity according to a zoom position of the zoom lens (focal length).

A conventional technique discussed in Japanese Patent Application Laid-Open No. 2005-286482 does not consider what type of communication system is used for switching to perform an appropriate communication between a camera and a lens.

SUMMARY OF THE INVENTION

According to an aspect of the present invention, an imaging apparatus, to which a lens unit with an optical member is attached and which communicates with the lens unit to transmit a control signal for the optical member, includes a communication unit configured to communicate with the attached lens unit, an imaging unit configured to be able to capture an object image formed by the optical member of the attached lens unit, a lens information acquisition unit configured to acquire individual information of the attached lens unit, a determination unit configured to determine a communication system with the lens unit, and a reset instruction unit configured to instruct the lens unit to reset the optical member thereof, wherein a first communication system is used for communication for acquiring the individual information of the lens unit by the lens information acquisition unit, and a second communication system different from the first communication system is used for communication for instructing the lens unit to reset the optical member by the reset instruction unit.

According to another aspect of the present invention, a lens unit exposing an object image on an imaging apparatus including an imaging unit capable of capturing the object image includes an optical member capable of being driven, a communication unit configured to communicate with the imaging apparatus, to which the lens unit is attached, a memory configured to store individual information, a setting unit configured to set a communication system with the imaging apparatus, and a reset unit configured to reset the optical member in response to an instruction from the imaging apparatus, to which the lens unit is attached, wherein a first communication system is used when the individual information of the lens unit is transmitted to the imaging apparatus, to which the lens unit is attached, and a second communication system different from the first communication system is used for subsequently receiving an instruction of the reset operation of the lens unit.

Further features of the present invention will become apparent from the following description of exemplary embodiments with reference to the attached drawings.

BRIEF DESCRIPTION OF THE DRAWINGS

FIGS. 17A and 17B are flow charts illustrating processing of the camera and the lens at the time of switching the communication systems synchronized with the imaging timing signal and not synchronized with the imaging timing signal according to the exemplary embodiment of the present invention.

FIG. 20 is a flow chart illustrating optical correction data communication.

DESCRIPTION OF THE EMBODIMENTS

Figure 1:
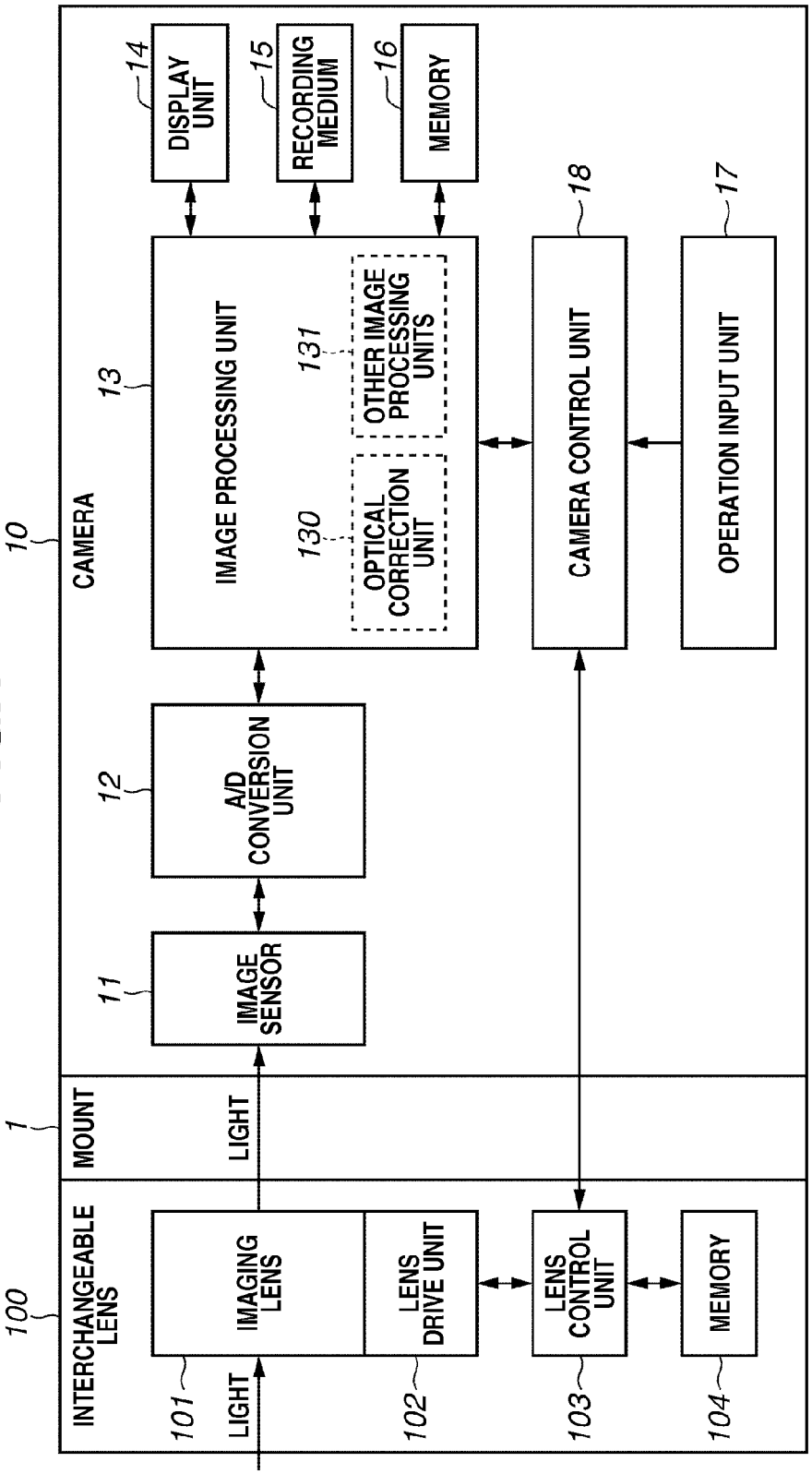
FIG. 1 is a block diagram illustrating an example of a functional configuration of an interchangeable lens digital video camera system as an example of an imaging apparatus according to a first exemplary embodiment of the present invention.

FIG. 1 illustrates a block diagram of an example of a functional configuration of an interchangeable-lens digital video camera system as an example of an imaging apparatus according to a first exemplary embodiment of the present invention. The camera system includes a camera 10 and an interchangeable lens 100 being a lens unit detachable from the camera 10. Amount 1 is a mechanism for attaching or detaching the interchangeable lens 100 to or from the camera 10, and includes an electrical contact for supplying power from the camera 10 to the interchangeable lens 100 and for performing communication between the camera 10 and the interchangeable lens 100. The mount 1 is divided into a part included in the camera 10 and a part included in the interchangeable lens 100. For the sake of convenience, however, the parts are illustrated an one component in FIG. 1.

An image sensor 11 is a photoelectric conversion device with a plurality of pixels. The image sensor 11 causes each pixel to photo-electrically convert an object image formed by an imaging lens 101 in the interchangeable lens 100, and outputs an analog electric signal corresponding to the object image. The image sensor 11 is configured to enable capturing the object image. An analog-to-digital (A/D) conversion unit 12 converts an analog signal output by the image sensor 11 into a digital signal. An image processing unit 13 applies various types of image processing to the digital signal output by the A/D conversion unit 12 to generate image data. The image processing unit 13 includes an optical correction unit 130 providing an optical correction function to correct image degradation due to the optical characteristic of the imaging lens 101 by the image processing, and an other image processing unit 131 that performs image processing such as pixel interpolation processing, luminance signal processing, and color signal processing. The image data generated by the image processing unit 13 is displayed on a display unit 14 and recorded in a recording medium 15 such as a memory card.

A memory 16 is used as a process buffer of the image processing unit 13 and a storage device of a program executed by a camera control unit 18 described below. The memory 16 is also used as a storage device for a below-mentioned optical correction data, on which an optical correction value used by the optical correction unit 130 is defined, and as a storage device for graphic user interface (GUI) data, such as a menu screen, which the camera 10 displays on the display unit 14.

An operation input unit 17 is an input-device group for a user inputting instructions to the camera, such as a power switch for turning on/off a power source, an imaging switch for starting to record an image, and a selection/setting switch for setting various menus. A camera control unit 18 includes a microcomputer, executes the program stored in the memory 16, and performs the operation control of the entire camera system, such as control of the image processing unit 13 and communication control with the interchangeable lens 100.

A lens drive unit 102 of the interchangeable lens 100 drives an actuator and a motor of the imaging lens 101 according to control of a lens control unit 103. The actuator and the motor of the imaging lens 101 move and operate a focus lens, a zoom lens, a diaphragm, and an image stabilization lens of the imaging lens 101. The lens control unit 103 includes a microcomputer, and controls the lens drive unit 102 according to a control signal received from the camera control unit 18 via the mount 1. A memory 104 is used as a storage device for various data used by the lens control unit 103.

Figure 4:
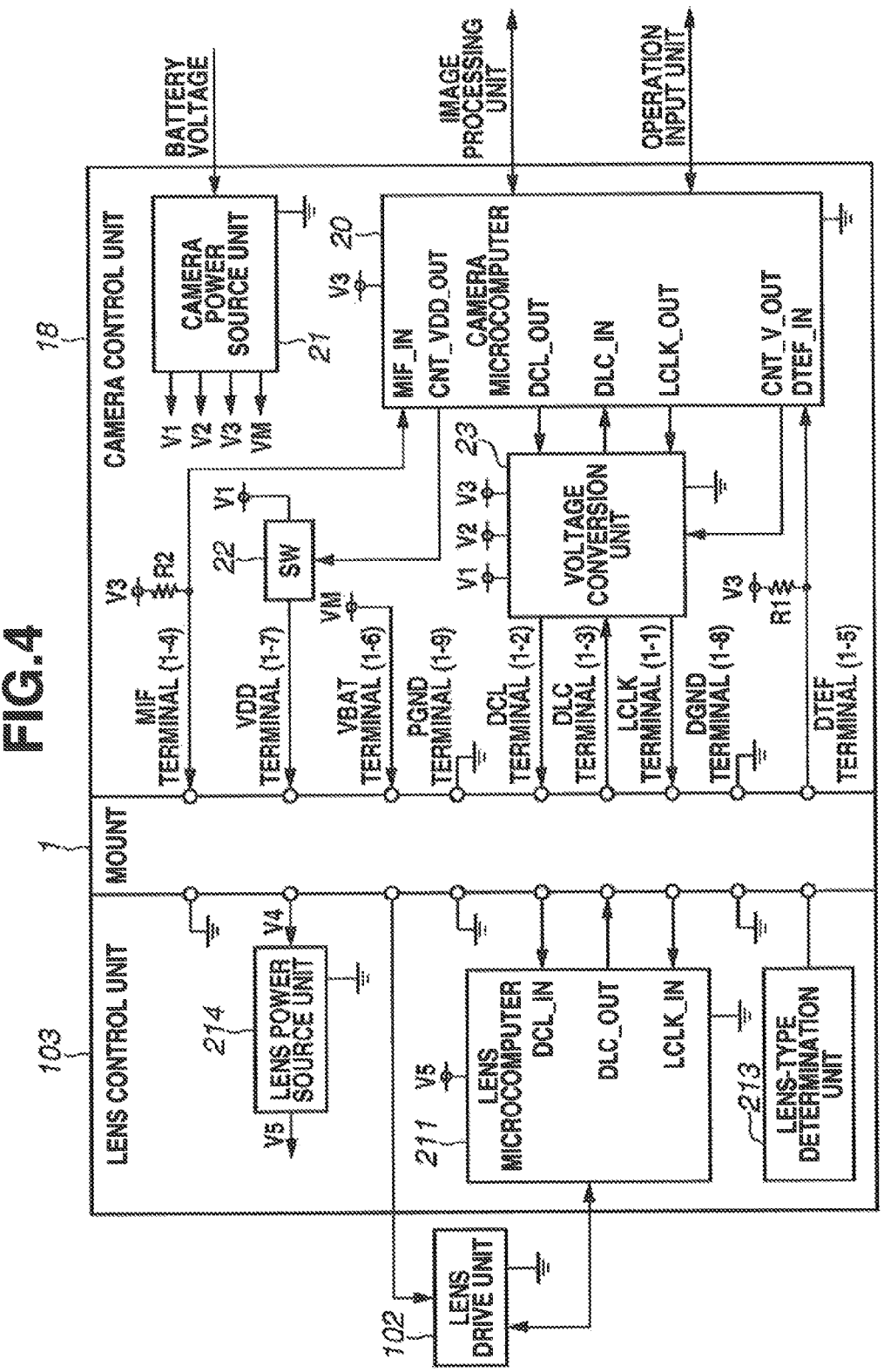
FIG. 4 is a block diagram illustrating an example of configuration according to communication between a camera control unit and a lens control unit.

FIG. 4 is a block diagram illustrating an example of configuration according to communication between the camera control unit 18 and the lens control unit 103.

Terminals of the mount 1 are described below.

An LCLK terminal 1-1 is a terminal used for a communication clock signal output from the camera 10 to the interchangeable lens 100. A DCL terminal 1-2 is a terminal used for communication data output from the camera 10 to the interchangeable lens 100. A DCL terminal 1-3 is a terminal used for communication data output from the interchangeable lens 100 to the camera 10.

An MIF terminal 1-4 is a terminal for detecting that the interchangeable lens 100 is attached to the camera 10. The microcomputer 20 in the camera control unit 18 (hereinafter, referred to as a camera microcomputer) detects that the interchangeable lens 100 is attached to the camera 10 based on the voltage of the MIF terminal 1-4.

A DTEF terminal 1-5 is a terminal for detecting the type of the interchangeable lens 100 attached to the camera 10.

The camera microcomputer 20 detects the type of the interchangeable lens 100 attached to the camera 10 based on the voltage of the DTEF terminal 1-5.

A VBAT terminal 1-6 is a terminal for supplying a drive power source (VM) used for various operations excluding communication control to the interchangeable lens 100 from the camera 10. A VDD terminal 1-7 is a terminal for supplying a communication control power source (VDD) used for communication control to the interchangeable lens 100 from the camera 10. A DGND terminal 1-8 is a terminal for connecting a communication control system of the camera 10 and the interchangeable lens 100 to the ground. A PGND terminal 1-9 is a terminal for connecting a mechanical drive system including an actuator and a motor provided on the camera 10 and the interchangeable lens 100 to the ground.

A plurality of types of the interchangeable lenses 100 which are different in voltage for communication with the camera 10 can be connected to the camera 10 of the present exemplary embodiment. In the following description, for the sake of simplifying description and facilitating understanding, there are two types of the interchangeable lenses 100 which the camera 10 identifies based on the voltage of the DTEF terminal 1-5: a first interchangeable lens (a first lens unit); and a second interchangeable lens (a second lens unit) different in voltage for communication with the first lens unit.

The "type" detected by the voltage of the DTEF terminal 1-5 is the one that is classified according to the "type" of an optical parameter required for identifying the optical correction value, and does not always correspond to a "model." The "type" of the interchangeable lens previously associated with the "type" of the optical parameter required for identifying the optical correction value may be stored in the memory 16, for example.

In the present exemplary embodiment, the first interchangeable lens is the one that the optical parameter required for identifying the optical correction value is information from which each of a focal length (units in mm), a photographing distance (units in cm), and an aperture value can be identified. The information from which the focal length can be identified is a value of a focal length and a position of a zoom lens, for example. The information from which the photographing distance can be identified is a value of a photographing distance and a position of a focus lens, for example. The information from which the aperture value can be identified is an aperture value and a value corresponding to the aperture value, for example.

The second interchangeable lens is the one that the optical parameter required for identifying the optical correction value is information from which each of an aperture value and a photographing magnification can be identified. The information from which the photographing magnification can be identified is a value of a photographing magnification and positional information about an optical member for controlling the photographing magnification, for example. A macro lens is an example of the interchangeable lens corresponding to the second interchangeable lens. The photographing magnification of the macro lens is changed by the optical member whose position is changed by the rotation of a magnification change ring. For this reason, the photographing magnification may be used as identifiable information, and positional information about a photographing magnification changing mechanism such as the magnification change ring may be used as positional information about the optical member for controlling the photographing magnification.

A camera power source unit 21 provided in the camera control unit 18 converts a battery voltage supplied from the battery mounted on the camera 10 into voltage required for the operation of each unit. In the present exemplary embodiment, the camera power source unit 21 generates voltages V1, V2, V3, and VM.

A first voltage V1 is a power source voltage as a communication control power source (VDD) for the first and second interchangeable lenses and a communication voltage for the first interchangeable lens. A second voltage V2 is a communication voltage for the second interchangeable lens. A third voltage V3 is a power source voltage used as a power source for operating the camera microcomputer 20. A fourth voltage V4 is a power source voltage used as a power source for driving the first and second interchangeable lenses.

When power is turned on by the operation of the power switch of the operation input unit 17, the camera microcomputer 20 outputs a signal for turning on a switch 22 from a CNT_VDD_OUT terminal and the camera 10 starts to supply the VDD and the VM to the interchangeable lens 100. When the camera microcomputer 20 is instructed to turn off the power, the camera microcomputer 20 stops outputting the signal from the CNT_VDD_OUT terminal to turn off the switch 22, so that the camera 10 stops supplying the VDD and the VM to the interchangeable lens 100.

The camera microcomputer 20 communicates with the interchangeable lens 100 via a voltage conversion unit 23. The camera microcomputer 20 includes an LCLK_OUT terminal for outputting a communication clock signal, a DCL_OUT terminal for outputting communication data to the interchangeable lens, and a DLC_IN terminal for receiving communication data from the interchangeable lens. The communication clock signal and the communication data are signals for communication.

The camera microcomputer 20 further includes an MIF_IN terminal for detecting whether the interchangeable lens 100 is attached, a DTEF_IN terminal for identifying the type of the interchangeable lens 100, and a CNT_V_OUT terminal for outputting a communication voltage switching signal to the voltage conversion unit 23.

The camera microcomputer 20 still further includes the CNT_VDD_OUT terminal for outputting a signal for turning on and off the switch 22, a terminal for connecting the camera microcomputer 20 with the image processing unit 13, and a terminal for connecting the camera microcomputer 20 with the operation input unit 17.

The microcomputer 211 in the lens control unit 103 (hereinafter, referred to as a lens microcomputer) communicates with the camera microcomputer 20 via the voltage conversion unit 23 of the camera control unit 18. The lens microcomputer 211 includes an LCLK_IN terminal for receiving a communication clock signal, a DLC_OUT terminal for outputting communication data to the camera 10, a DCL_IN terminal for receiving communication data from the camera 10, and a terminal for connecting the lens microcomputer 211 with the lens drive unit 102. The lens control unit 103 includes a lens power source unit 214 for generating a voltage for operating the lens microcomputer 211 from the VDD.

The following describes a method for detecting whether the interchangeable lens 100 is attached to the camera 10. The MIF_IN terminal of the camera microcomputer 20 is pulled up to the power source by a resistor R2 (100 KΩ), so that the voltage value of the MIF_IN terminal is at a high level when the interchangeable lens 100 is not attached. However, when the interchangeable lens 100 (the first and second interchangeable lenses) is attached, the MIF_IN terminal is connected to ground (GND) in the interchangeable lens 100, so that the voltage value is brought into a low level (L) independently of the type of the interchangeable lens 100.

Figure 5A:
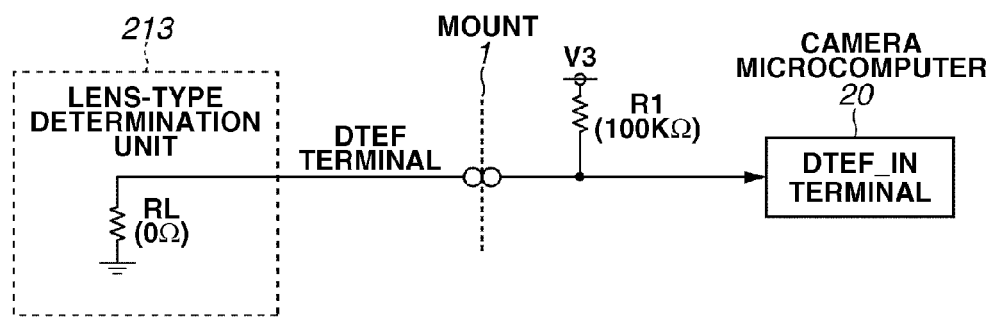
FIGS. 5A and 5B illustrate examples of configuration of a lens-type determination unit of the lens control unit in FIG. 4.
Figure 5B:
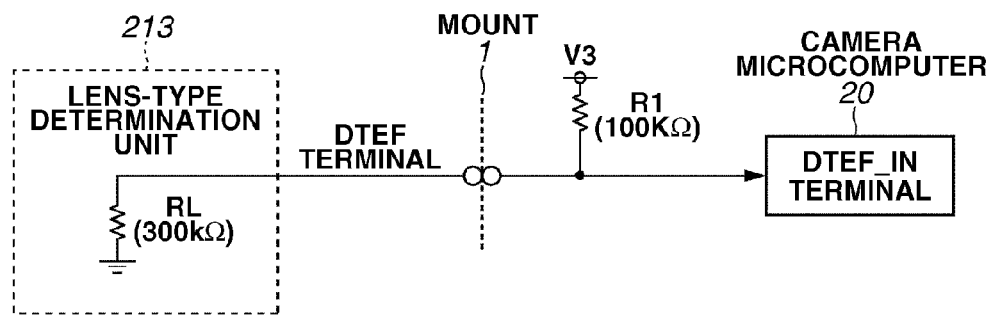

FIGS. 5A and 5B illustrate examples of configuration of a lens-type determination unit 213 of the lens control unit 103. The lens-type determination unit 213 includes an accessory-side resistor RL provided between a DTEF terminal provided on the mount 1 and the GND. The value of the resistor RL is previously set according to the type of the interchangeable lens 100. The resistor RL provided on the first interchangeable lens illustrated in FIG. 5A is set to 0Ω and the resistor RL provided on the second interchangeable lens illustrated in FIG. 5B is set to 300Ω, for example.

In the camera 10, a camera-side resistor R1 (100 KΩ, for example) is connected between the DTEF terminal of the mount 1 and the voltage (V3) of an operation power source of the camera microcomputer 20, and the DTEF terminal is connected to the DTEF_IN terminal of the camera microcomputer 20. The DTEF_IN terminal of the camera microcomputer 20 has an analog-to-digital (AD) conversion function (a 10-bit AD conversion function with 0 to 1.0 V as an input range).

The following describes how the camera microcomputer 20 determines the type of the interchangeable lens 100. The camera microcomputer 20 determines the type of the attached interchangeable lens 100 according to a voltage value to be input to the DTEF_IN terminal. More specifically, the camera microcomputer 20 performs analog-to-digital (AD) conversion on the input voltage value and, compares the AD conversion value with a lens-type determination reference previously stored in the camera microcomputer 20 to determine the type of the lens.

When the first interchangeable lens is attached, the AD conversion value of the voltage input to the DTEF_IN terminal is determined to be about "0x0000" by a resistance ratio of RL/(R1+RL), where the R1 is 100 KΩ and the RL is 0Ω. For this reason, the camera microcomputer 20 determines that the AD conversion value of the DTEF_IN terminal falls within the range of "0x0000 to 0x007F", which is the first lens type determination reference, to determine that the attached interchangeable lens is the first interchangeable lens.

When the second interchangeable lens is attached, the AD conversion value of the voltage input to the DTEF_IN terminal is determined to be about "0x02FF" by a resistance ratio of RL/(R1+RL), where the R1 is 100 KΩ and the RL is 300 KΩ. For this reason, the camera microcomputer 20 determines that the AD conversion value of the DTEF_IN terminal falls within the range of "0x0280 to 0x037F", which is the second lens type determination reference, to determine that the attached interchangeable lens is the second interchangeable lens.

As described above, the camera microcomputer 20 determines the type of the attached interchangeable lens 100 based on the voltage value input to the DTEF_IN terminal. The camera microcomputer 20 controls the logic level of the signal output from the CNT_V_OUT terminal according to the determination result of the type of the interchangeable lens 100. Specifically, if the camera microcomputer 20 determines that the attached interchangeable lens 100 is the first interchangeable lens from the voltage value of the DTEF_IN terminal, the camera microcomputer 20 outputs a high-level (H-level) signal from the CNT_V_OUT terminal and sets a communication voltage to V1. If the camera microcomputer 20 determines that the attached interchangeable lens 100 is the second interchangeable lens, the camera microcomputer 20 outputs a low-level (L-level) signal from the CNT_V_OUT terminal and sets the communication voltage to V2.

The camera microcomputer 20 determines the frequency of a clock output from the LCLK terminal according to the determination result of the type of the attached interchangeable lens 100. Since a comparatively old lens, for example, tends to correspond only to communication at a low frequency, such an old lens is determined as the first interchangeable lens and initial communication is started at a low frequency. If the camera microcomputer 20 determines that the attached interchangeable lens 100 is the second interchangeable lens, initial communication is started at a high-speed baud rate. This allows the initial communication to be performed for a comparatively new lens at a high-speed baud rate from the initial communication without performing communication once and a transfer of a mutually communicable baud rate, enabling a starting time to be reduced.

Figure 13:
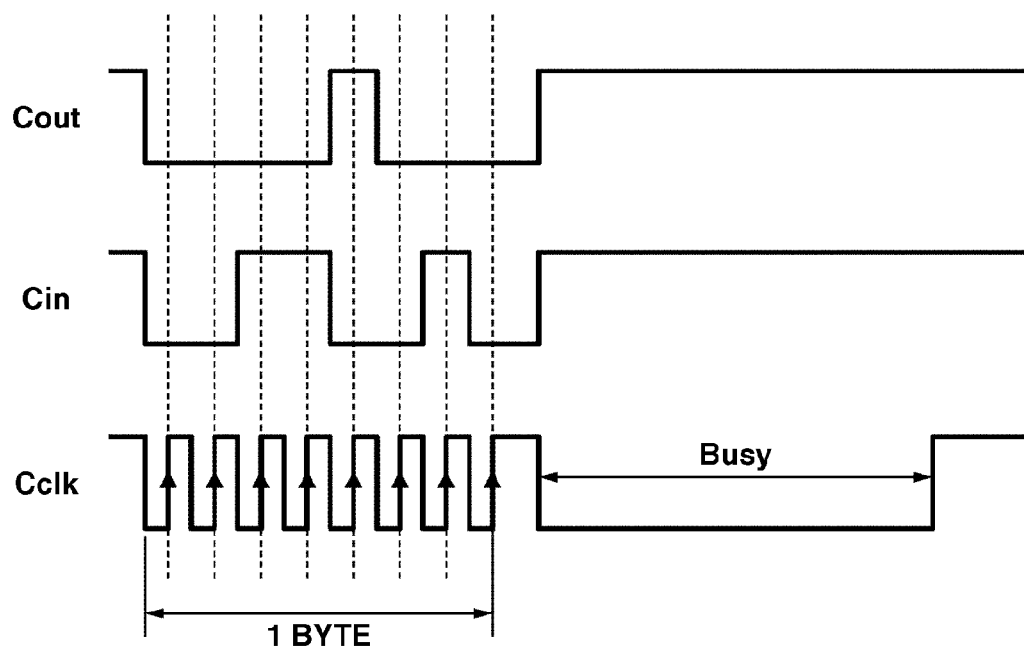
FIG. 13 is a timing chart illustrating a communication system of initial communication in attaching the first interchangeable lens according to the exemplary embodiment of the present invention.

FIG. 13 illustrates a synchronous clock system as an example of the initial communication.

Communication terminals Cout, Cin, and Cclk correspond to the DCL, DLC, and LCLK terminals. The camera supplies the Cclk waveform to the lens. Both the camera and the lens transfer data signals to Cin and Cout to synchronize the data signal with the Cclk waveform. There exists a period for which a signal from the communication terminal Cclk is kept at an L-level output over a predetermined time period. The period is the one for which the lens control unit 103 performs a lens-side processing such as drive control of a focus unit. The camera stops transmitting clocks during the period. If the attached lens is the first interchangeable lens, a clock is supplied at a low-speed baud rate. If the attached lens is the second interchangeable lens, a clock is supplied at a high-speed baud rate.

If the camera microcomputer 20 detects a voltage value outside the reference for determining the first and second lenses as the voltage value (AD conversion value) of the DTEF_IN terminal, the camera microcomputer 20 determines that a "non-adaptive lens", which is a lens to which the camera 10 is not adapted, is attached. Alternatively, the camera microcomputer 20 reserves the determination since the type of the lens cannot be normally determined. In both cases, the camera microcomputer 20 does not communicate with the interchangeable lens 100.

[Necessity of Optical Correction]

Necessity of optical correction is described below. In a stationary-lens imaging apparatus, optical correction values related to combinations of all optical parameter values may be previously obtained. Actually, only discrete combination is stored according to a required storage capacity and the not-stored combinations may be obtained by interpolation. However, it is comparatively easy to ensure correction accuracy.

In an interchangeable-lens imaging apparatus, on the other hand, there are a great number of different types of attachable lens units. Specific lenses such as a macro lens and a shift lens exist among them.

It is also necessary to ensure interchangeability with lens units which are not adapted to a new communication protocol and to perform an appropriate camera-control adapted to the type of the attached lens unit and the functions of the lens unit.

As described above, even in a single interchangeable lens, optical characteristics thereof are different for each combination of a plurality of optical parameters. In a general lens, an optical correction value can be uniquely obtained by a combination of focal length, photographing distance, and aperture value. However, it is sometimes necessary to obtain other optical parameters to identify the optical correction value due to diversification of the lens unit. The following describes this respect.

Figure 2:
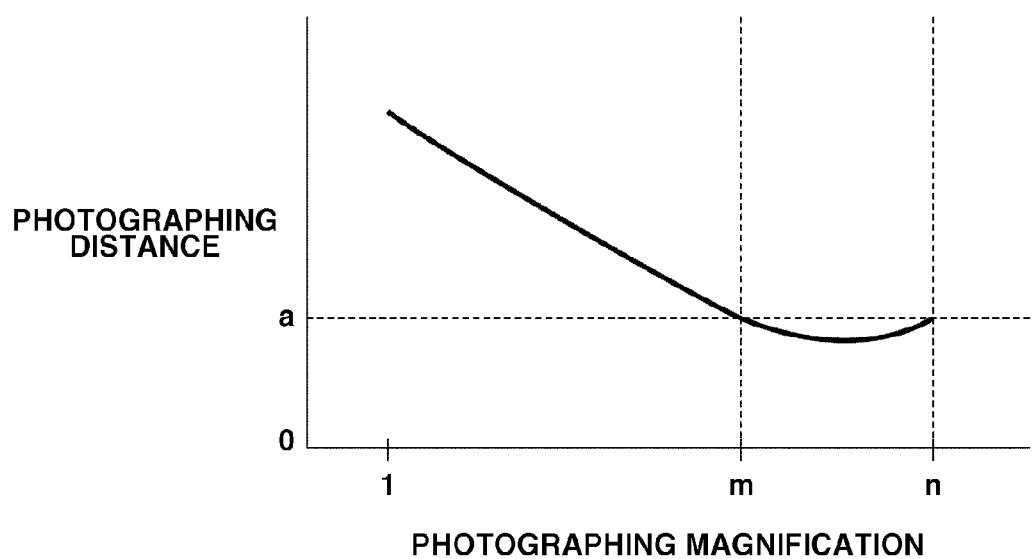
FIG. 2 illustrates an example of a relation between magnification and a photographing distance of a single focus macro lens.

FIG. 2 illustrates an example of a relation between magnification and a photographing distance of a single focus macro lens capable of capturing an image at equal magnification to n-times magnification. In the example, the photographing distances have the same value between photographing magnifications m and n. The optical characteristic changes with the photographing magnification, so that the optical correction values are different between the photographing magnifications m and n.

FIGS. 3A, 3B, 3C, and 3D illustrate characteristics of light falloff at edges of the macro lens with the characteristic illustrated in FIG. 2 and examples of results of correcting the light falloff at edges using the optical correction value obtained from the photographing distance illustrated in FIG. 2. More specifically, FIGS. 3A, 3B, 3C, and 3D illustrate how the brightness (light quantity) of the image obtained by imaging an object with a uniform luminance changes according to an image height being a distance from an image center with the brightness of the image center as 100.

Figure 3A:
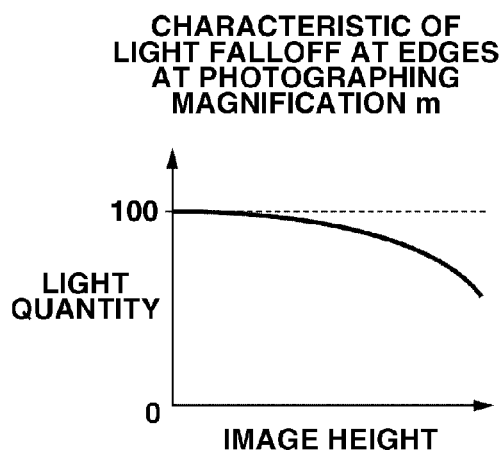
FIGS. 3A, 3B, 3C, and 3D illustrate characteristics of light falloff at edges of the macro lens with the characteristic illustrated in FIG. 2, and examples of results of correcting the light falloff at edges using an optical correction value obtained from the photographing distance illustrated in FIG. 2.
Figure 3B:
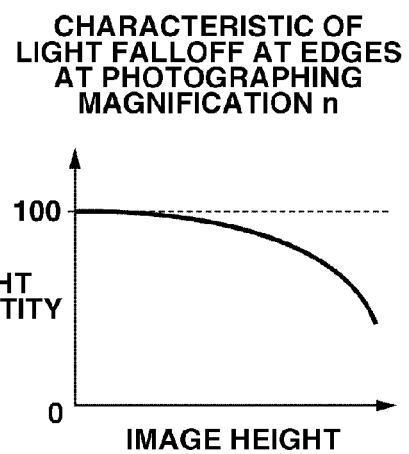

FIGS. 3A and 3B illustrate the characteristics of light falloff at edges of the macro lens in the photographing magnifications m and n, respectively. FIGS. 3A and 3B are common in that the light quantity decreases according as the image height increases (toward the periphery of a screen from the center of the screen). However, the characteristics are different. Therefore, the optical correction value of the light falloff at edges to be used cannot be identified from the combination of focal length, photographing distance, and aperture value for at least one of the photographing magnifications m and n.

Figure 3C:
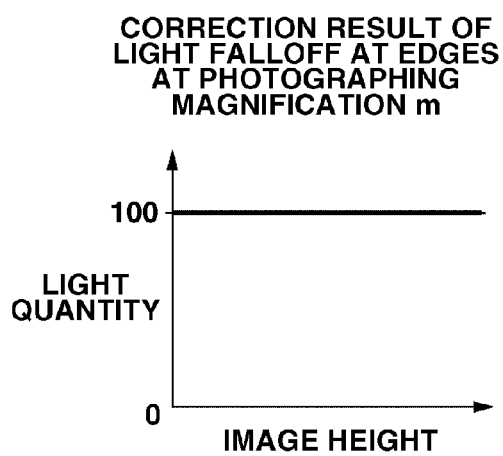
Figure 3D:
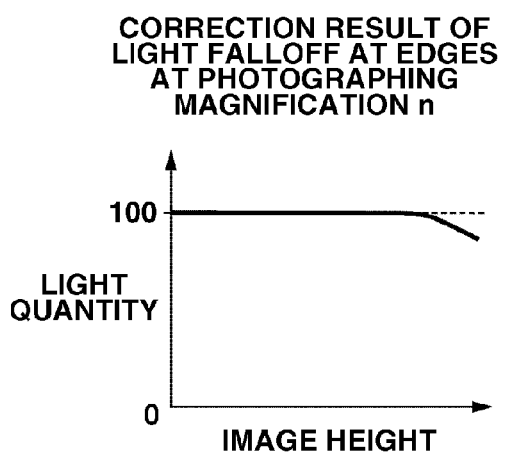

FIGS. 3C and 3D illustrate examples of results of correction using the optical correction value identified without consideration of the photographing magnification. In the examples, the light falloff at edges is appropriately corrected in the photographing magnification m. However, correction is insufficient and an appropriate correction is not performed in the photographing magnification n. Thus, an appropriate optical correction value sometimes cannot be independently determined by information about the focal length, photographing distance, and aperture value depending on the lens unit.

Information for identifying the photographing magnification is required to apply an appropriate optical correction to the image captured using the macro lens with the characteristic illustrated in FIG. 2, for example. The photographing magnification can be automatically set by manual operation of the magnification change ring provided on the lens unit, for example. If the set photographing magnification is known, an appropriate optical correction value can be identified.

Thus, in the interchangeable lens imaging apparatus, optical parameter values required for identifying the optical correction value need to be obtained for each type of lens unit to apply an appropriate optical correction to images to be captured by various different types (models) of lens units.

[Processing for Determining Type of Interchangeable Lens]

Figure 6:
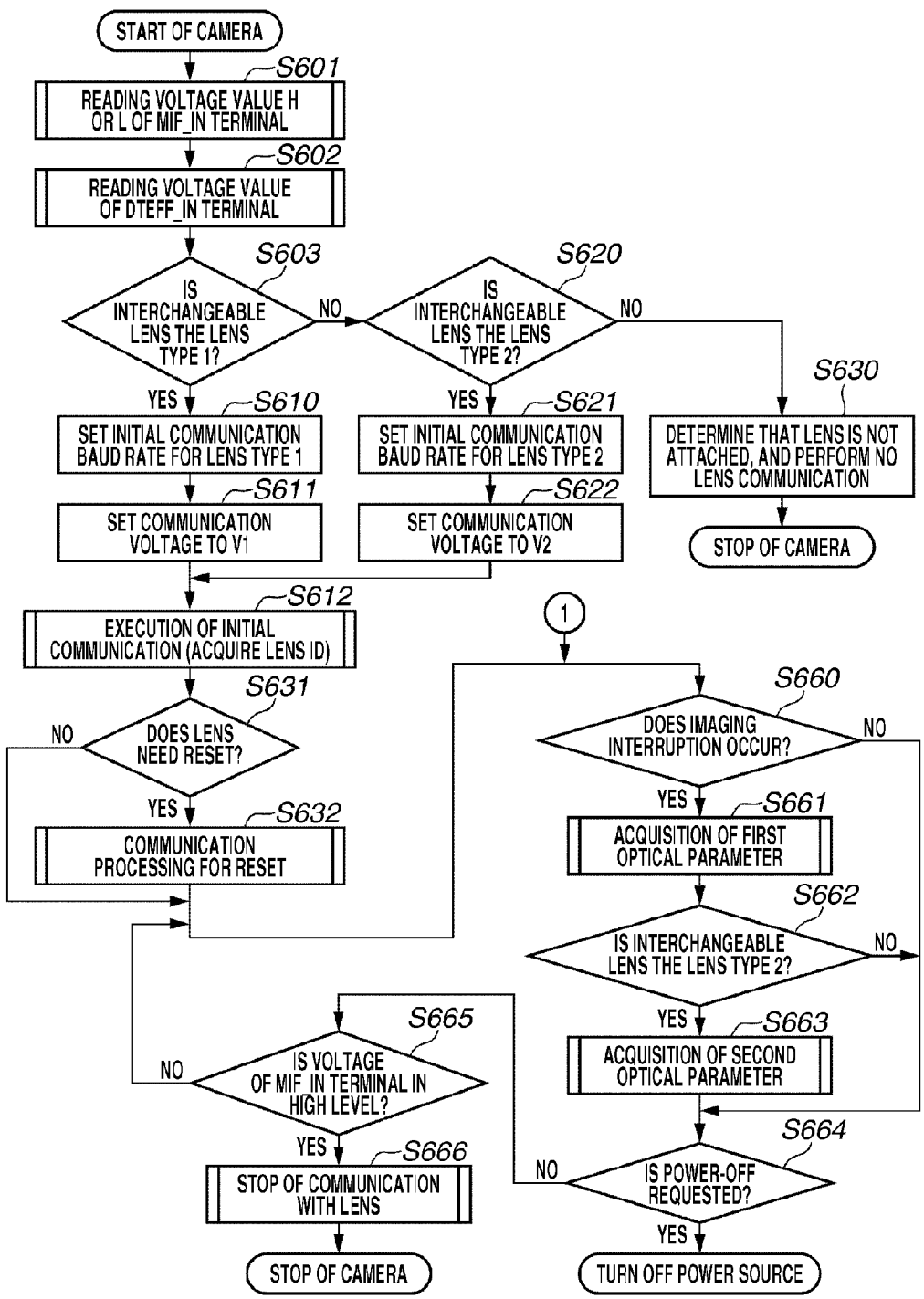
FIG. 6 is a flow chart illustrating processing for determining the type of an interchangeable lens, a communication control method for each lens type, and processing for receiving an optical parameter which are performed by the camera control unit according to the first exemplary embodiment of the present invention.

FIG. 6 is a flow chart illustrating processing for determining the type of an interchangeable lens and processing for receiving an optical parameter which are performed by the camera microcomputer 20 in the present exemplary embodiment. The processing illustrated in FIG. 6 is performed by the camera microcomputer 20 executing the programs stored in the memory 16.

In steps S601 and S602, the camera microcomputer 20 reads the voltage values H or L of the MIF_IN terminal and a voltage value of the DTEF_IN terminal, respectively. The signals may be obtained in parallel from the MIF_IN and DTEF_IN terminals.

In step S603, if the voltage value of the MIF_IN terminal is L and the attachment of the interchangeable lens 100 is detected, the camera microcomputer 20 determines the type of the attached interchangeable lens 100 based on the voltage value (the AD conversion result) of the DTEF_IN terminal. If the camera microcomputer 20 determines that the attached interchangeable lens 100 is the first interchangeable lens (denoted as a lens type 1 in FIG. 6) (YES in step S603), then in step S610, the camera microcomputer 20 sets the communication baud rate of the initial communication for the lens type 1. In the present exemplary embodiment, it is assumed that a lens type 1 includes a lens adapted only to a low-speed baud rate communication and communication processing is performed at a low speed (step S612 described below). In step S611, the camera microcomputer 20 outputs the high-level signal from the CNT_V_OUT terminal and sets the communication voltage to V1. The processing proceeds to step S612.

If the camera microcomputer 20 determines that the attached interchangeable lens 100 is the second interchangeable lens (denoted as a lens type 2 in FIG. 6) (YES in step S620), then in step S621, the camera microcomputer 20 sets the communication baud rate of the initial communication for the lens type 2. In the present exemplary embodiment, it is assumed that the lens type 2 includes a lens adapted to a high-speed baud rate communication and communication processing is performed at a high-speed (step S612 described below). In step S622, the camera microcomputer 20 outputs the low-level signal from the CNT_V_OUT terminal and sets the communication voltage to V2. The processing proceeds to step S612. If the camera microcomputer 20 determines that the attached interchangeable lens 100 is neither the first interchangeable lens nor the second interchangeable lens (NO in step S603 and step S620), then in step S630, the camera microcomputer 20 determines that the attached interchangeable lens 100 is an "unadapted lens" or reserves determination. The camera microcomputer 20 stops processing instead of starting communication with the attached interchangeable lens 100. At this point, the camera microcomputer 20 may give a warning to the user.

In step S612, the camera microcomputer 20 starts communication with the interchangeable lens 100 at the set communication voltage and communication baud rate.

In step S612, the camera microcomputer 20 performs initial data exchange processing with the lens. Thereby, the camera microcomputer 20 obtains a lens ID as the individual information of the interchangeable lens 100 to acquire information about the type of the lens, indicating which function the attached interchangeable lens 100 is adapted to. Thereby, the camera microcomputer 20 functions as a lens information acquisition unit. The lens ID of the individual information is stored in the memory 104 being a lens information storage unit.

Information about the type of the lens includes information about whether a reset operation is required (described below in step S631), whether optical correction data can be obtained by communication (described below in step S633), and whether the lens is adaptable to a communication system synchronized with an imaging timing signal. Since an optical member which can be driven performs a positional control, the reset operation is a process operation for the lens control unit 103 detecting the reference position of the control. In the following description, the communication system synchronized with the imaging timing signal may be written as a moving image communication system and the communication system not synchronized with the imaging timing signal may be written as a still image communication system. In other words, the moving image communication system as a second communication system is a communication system that transmits a signal synchronized with a vertical synchronous signal corresponding to timing for reading an imaging signal from the sensor to the interchangeable lens 100. This realizes a lens and diaphragm drive control synchronized with the image timing.

In step S631, the camera microcomputer 20 determines whether the lens can adapt to the reset operation based on the information about the type of the lens obtained in step S612. If the lens can adapt to the reset operation (YES in step S631), the processing proceeds to step S632.

[Reset Communication Processing 1]

Figure 19:
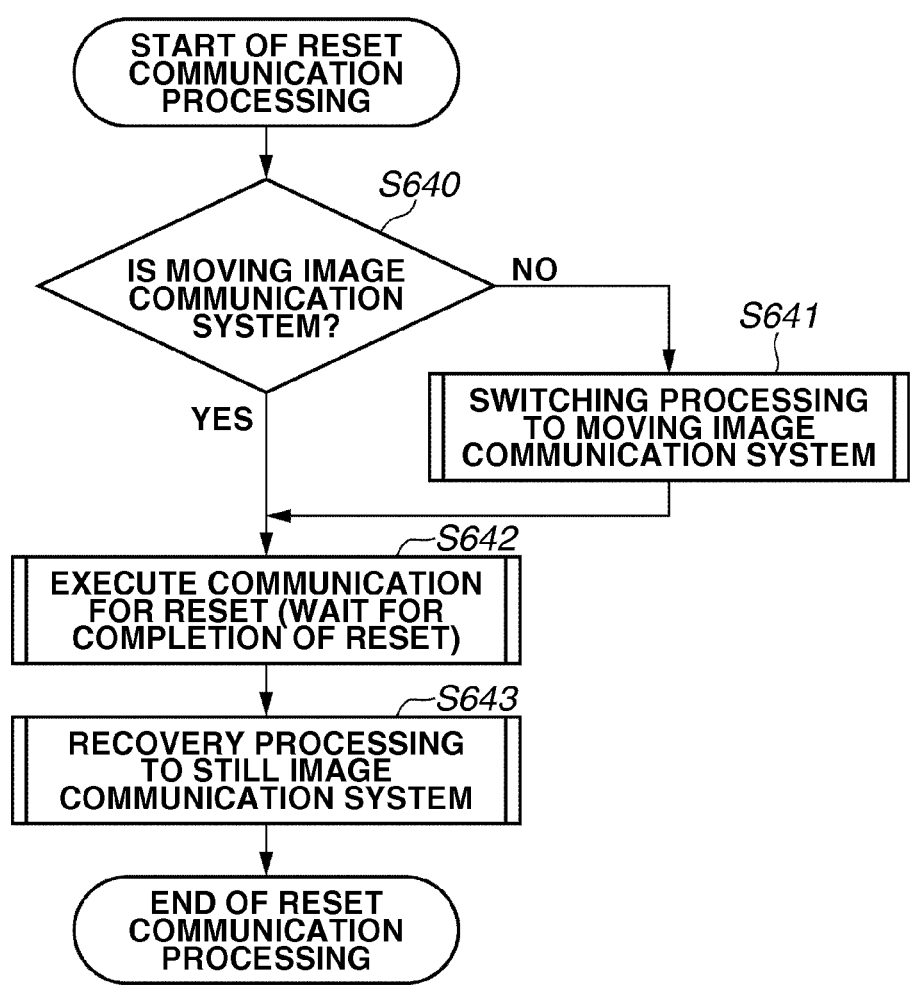
FIG. 19 is a flow chart illustrating reset communication processing.

FIG. 19 illustrates the processing in step S632. When the camera microcomputer 20 starts the reset communication processing, in step S640 illustrated in FIG. 19, the camera microcomputer 20 checks if the communication system is the moving image communication system. If the communication system is not the moving image communication system (NO in step S640), in step S641, a communication state is switched from the still image communication system to the moving image communication system.

This is because it is desirable to perform control synchronized with the imaging timing signal when the reset operation is performed as the processing for the lens. More specifically, this is because the interchangeable lens adapted to the moving image communication system often uses the communication system synchronized with the imaging timing of the camera. The interchangeable lens adapted to such a moving image communication system desirably communicates using the moving image communication system at the time of a live view to adapt to the imaging timing. During the communication using the moving image communication system, it may be necessary to perform the reset again due to the step-out of the lens unit. It is desirable to realize the reset operation of the lens to avoid the imaging timing. That is why the reset operation is executed in the moving image communication system.

[Example of Still Image Communication System]

As illustrated in FIG. 13, the example of the still image communication system as the first communication system is a system that the camera microcomputer 20 functions as a master and transmits a control signal along with a clock signal to the interchangeable lens 100 at a predetermined timing.

[Example of Moving Image Communication System]

One of advantages of the moving image communication system is that the camera control unit 18 can easily perform control processing synchronized with the exposure time of the sensor 11. In other words, the camera control unit 18 can share the imaging timing with the lens control unit 103. This allows a focus control to be performed without using a contrast value (automatic focus (AF) evaluation value) of an image during the exposure time of the sensor 11, for example. This enables control for wobbling in consideration of the exposure time of the sensor 11.

Figure 14:
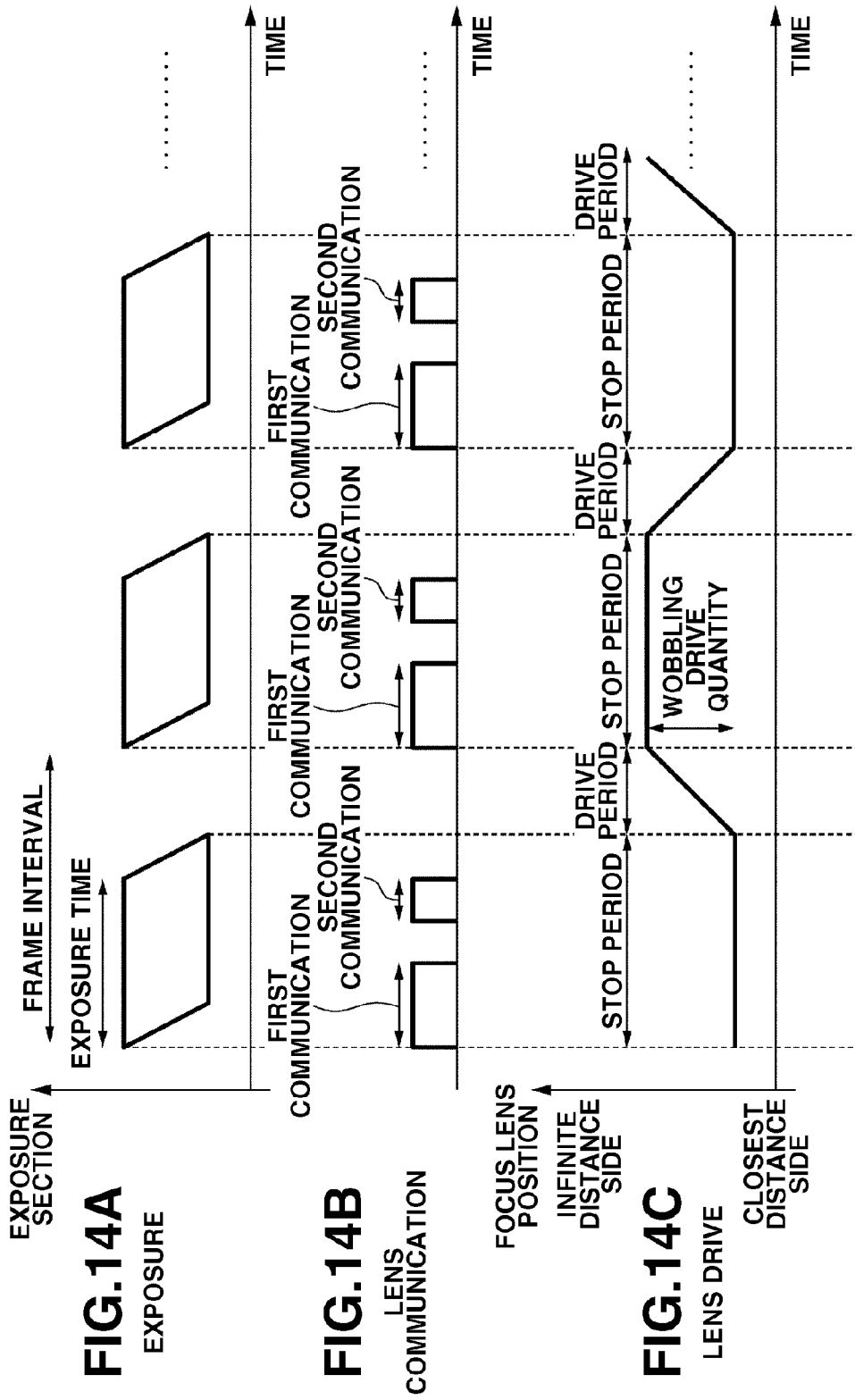
FIGS. 14A, 14B, and 14C illustrate communication systems synchronized with an imaging timing signal according to the exemplary embodiment of the present invention.
Figure 15:
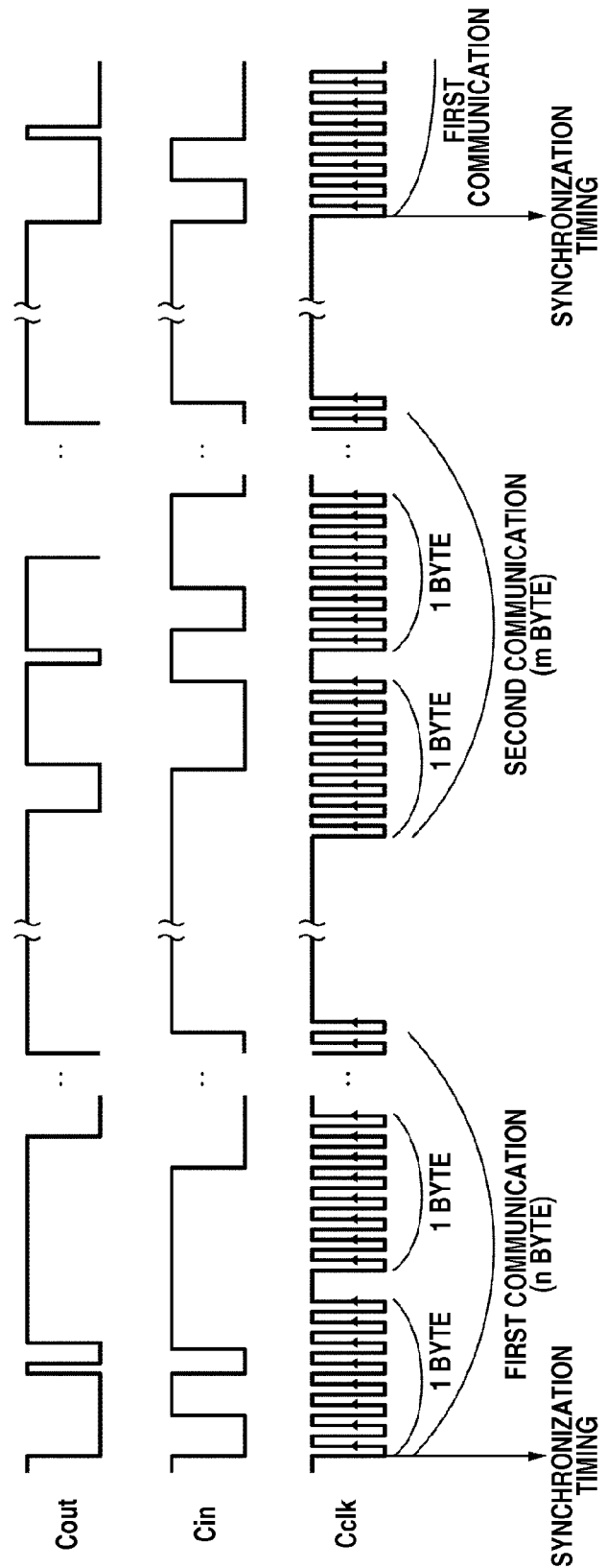
FIG. 15 illustrates a first and a second communication synchronized with the imaging timing signal according to the exemplary embodiment of the present invention.

In FIG. 14A, the abscissa is the time axis and represents a frame interval and an exposure time. FIG. 14B illustrates a communication processing between the camera control unit 18 and the lens control unit 103, and the abscissa is the time axis. In FIG. 14C, the abscissa is the time axis in the lens drive control and represents a stop period and the drive period of wobbling, and the ordinate is the position of the focus lens. FIG. 15 illustrates the communication processing including the first and the second communication illustrated in FIG. 14B.

Two types of the communication processing of the first and the second communication with the fixed length for each exposure period corresponding to the frame related to the imaging signal are performed. The camera synchronizes the start timing of the first communication with the imaging timing signal and notifies the lens of the imaging timing. In this configuration, the first communication transfers the data that are desirably transferred at timing near the imaging timing, the control information is generated based on the information transferred by the first communication, and the control information is sent to the lens by the second communication, which allows completing the lens control during 1V (one imaging timing period).

[Reset Communication Processing 2]

In step S641 in FIG. 19, the communication system is switched from the still image communication system to the moving image communication system. In step S642, a request for starting the reset operation is transmitted to the lens by the moving image communication system. Thereby, the camera microcomputer 20 functions as a reset instruction unit. For example, the camera requests the lens to perform the reset operation by the first communication at the communication terminal Cout and the lens notifies the camera of a reset completion state by the first communication at the communication terminal Cin. At first, in the first communication, data are exchanged and the camera control unit 18 determines whether the reset operation of position control of the imaging lens 101 in the interchangeable lens 100 is uncompleted. If the reset operation is uncompleted, the camera control unit 18 requests the lens to start the reset operation by the first communication performed later at the communication terminal Cout and the camera is notified that the lens completes the reset operation from the DLC_IN terminal. In step S642, the camera waits for the response of the completion of the reset operation from the lens.

The camera may separately transmit the reset request for units forming the lens unit, such as a focus lens, an image stabilization (IS) lens, a zoom lens, and a diaphragm, to the lens. If the reset request can be thus separately transmitted, the unit whose reset operation is completed may sequentially transmit drive requests. In this case, the camera control unit 18 needs to sequentially perform processing. In the above processing, the camera requests the lens to start the reset operation by the first communication, and, in response to the above request, if the lens control unit 103 subjects the focus lens, the optical image stabilization lens, the zoom lens, and the diaphragm to the reset operation, the following advantages are obtained. The lens control unit 103 can previously store the characteristics of the interchangeable lens 100, so that the lens control unit 103 can perform the reset operation in parallel with that. For example, if it takes a long time to perform the reset operation of the focus lens, the reset operation of the focus lens is started first, after that, the reset operation of the diaphragm and then the optical image stabilization lens is started, for example. A combination for performing the reset operation in parallel in view of power consumption may be stored.

The above description is performed on the assumption that communication on a request for the reset operation and the completion of the reset operation is performed by the first communication. However, the communication may be performed by the second communication.

In step S643, recovery processing is performed from the moving image communication system to the still image communication system. However, if a default setting system of the communication system is taken as the moving image communication system, the present processing is not required. For example, in a case where a wobbling control is not required, such as a manual focus setting, it is desirable to return to the still image communication system. In this respect, in a case where the wobbling control is desired to be executed, such as an object tracking setting, the moving image communication system may be remained unchanged.

[Switching Processing]

The following describes switching processing from the still image communication to the moving image communication in step S641 and switching processing from the moving image communication to the still image communication in step S643.

The switching processing from the moving image communication to the still image communication is described below with respect to FIGS. 17A and 17B.

In step S1700, the camera starts processing. In step S1701, the camera control unit 18 sets 1 to a bit predetermined as communication regulations (communication protocol) in the moving image communication system and performs communication to transmit a request for finishing the moving image communication system to the lens.

In step S1702, the communication system is switched to the still image communication system. After the request for switching the communication system to the still image communication is transmitted to the lens in step S1701, even if a communication request from the camera system to the lens occurs in a predetermined time, the request is reserved in a predetermined time. In step S1703, the present request processing is executed using the still image communication system after the predetermined time elapses. This is because it is ensured that the communication reception state of the lens is switched to the still image communication system after the predetermined time elapses.

In step S1720, while the lens is operating in the moving image communication system, in step S1721, the next reception interruption processing occurs from the camera. In step S1723, the lens control unit 103 makes reference to a bit corresponding to the request for finishing the moving image communication system among the received data of the moving image communication system. If the bit is 0 (no request for finishing is made) (NO in step S1723), in step S1726, the lens waits for receiving the second communication to be transmitted from the camera. If the bit is 1 (a request for finishing is made) (YES in step S1723), in step S1724, the communication setting is switched to the still image communication system within the predetermined time and the lens operates on the assumption that the second communication is not performed.

The present processing is an operation that the camera and lens sides mutually expect that switching of the communication setting is completed by the elapse of the predetermine waiting time. This is because both sides do not need to newly check if the communication system is switched because the start timing of switching the communication is synchronized by the moving image communication system.

[Switching to Still Image Communication System]

Figure 18A:
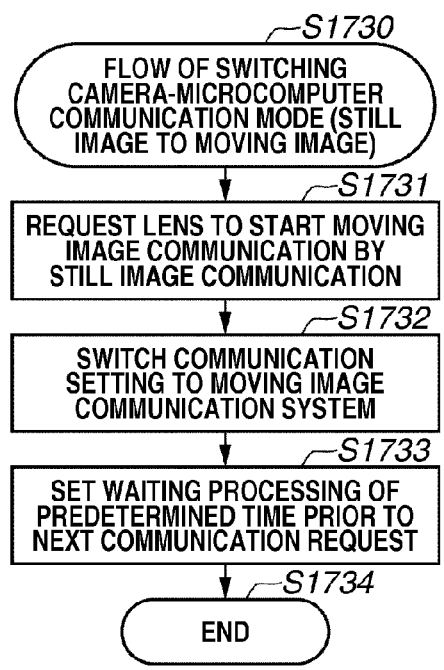
FIGS. 18A and 18B are flow charts illustrating processing for switching from a still image communication system to a moving image communication.
Figure 18B:
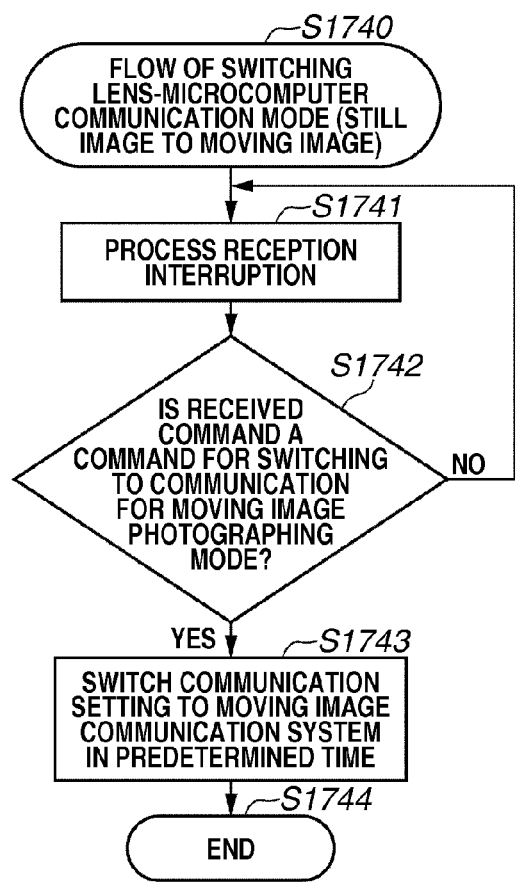

The switching processing from the still image communication system to the moving image communication is described below with respect to FIGS. 18A and 18B.

In step S1730, the camera control unit 18 starts processing. In step S1731, the camera control unit 18 transmits a command predetermined as communication regulations in the still image communication system to the interchangeable lens 100 to request the interchangeable lens 100 to start the moving image communication.

In step S1732, after the camera control unit 18 transmits the request, the camera control unit 18 switches the communication system to the moving still image communication system. After the request for switching the communication system to the moving image communication is transmitted to the lens in step S1731, in step S1733, even if a communication request from the camera system to the lens occurs in a predetermined time, the request is reserved in a predetermined time. The present request processing is executed using the moving image communication system after the predetermined time elapses.

In step S1740, while the lens is operating in the still image communication system, in step S1741, the next reception interruption processing occurs from the camera. In step S1742, the lens control unit 103 determines whether the received data is a command for requesting the lens to start the moving image communication.

If the received data is the command for requesting the lens to switch the communication setting to the moving image communication (YES in step S1742), in step S1743, the lens control unit 103 switches the communication setting to the moving image communication system within the predetermined time.

In step S660, the camera microcomputer 20 determines whether imaging interruption occurs in which the imaging switch of the operation input unit 17 starts recording an image. If the imaging interruption does not occur (NO in step S660), the camera microcomputer 20 causes the processing to proceed to step S664. If the imaging interruption occurs (YES in step S660), in step S661, the camera microcomputer 20 communicates with the interchangeable lens 100 to acquire a first optical parameter.

As described above, the first optical parameter is information required for identifying the optical correction value of the interchangeable lens 100 of the lens type 1 and a basic optical parameter of the interchangeable lens 100 including information capable of identifying each of at least a focal length, a photographing distance, and an aperture value. Since the information is usable for processing in addition to the optical correction, in the present exemplary embodiment, the first optical parameter is acquired independent of the determined type of the lens. In other words, in the present exemplary embodiment, even if the second interchangeable lens is attached, the first optical parameter is acquired in step S661.

In steps S662 and S663, the camera microcomputer 20 acquires a second optical parameter from the interchangeable lens 100 if it is determined that the interchangeable lens 100 is the second interchangeable lens in step S603. The second optical parameter is an optical parameter required for identifying the optical correction value of the second interchangeable lens. Since the second optical parameter normally includes at least apart of parameters acquired as the first optical parameter, optical parameters different from at least the first optical parameter among the second optical parameters are acquired. In the present exemplary embodiment, the second optical parameter includes information capable of identifying at least the photographing magnification. If the second lens is a macro lens, the optical correction value can be identified from the photographing magnification and the aperture value. The aperture value is already acquired as the first optical parameter, so that the aperture value does not need to be acquired in step S663. Thus, values overlapping with the first optical parameter among the second optical parameter do not need to be acquired again.

In step S664, the camera microcomputer 20 determines whether the interruption of turning off the power source by turning off the power source switch of the operation input unit 17 occurs. If the interruption of turning off the power source occurs (YES in step S664), the camera microcomputer 20 turns off the power source. If the interruption of turning off the power source does not occur (NO in step S664), in step S665, the camera microcomputer 20 determines whether the voltage of the MIF_IN terminal is at a high level, that is, the interchangeable lens 100 is detached from the camera 10. If the voltage at a high level is input from the MIF_IN terminal (YES in step S665), then in step S666, the camera microcomputer 20 stops communicating with the interchangeable lens 100. Then the camera 10 is stopped. If the voltage at a high level is not input from the MIF_IN terminal (NO in step S665), the camera microcomputer 20 returns the processing to step S660.

The camera control unit 18 performs such a communication processing to perform the communication processing adapted for the function of the attached interchangeable lens 100, allowing the determination of the type of the attached lens and the acquisition of the optical parameters required for identifying the optical correction value of the attached interchangeable lens 100.

The example illustrated in FIG. 6 describes the method for determining the type of the attached interchangeable lens 100 according to the voltage value input to the DTEF_IN terminal. However, other determination methods may be used. For example, the type of the lens may be determined by receiving information about the type of the lens immediately after the step S660 from the interchangeable lens 100 without determining the type of the lens in steps S601 and S602 and setting the output voltage and communication baud rate according to the type of the lens in steps S610 and S611 and steps S621 and S622.

Figure 7:
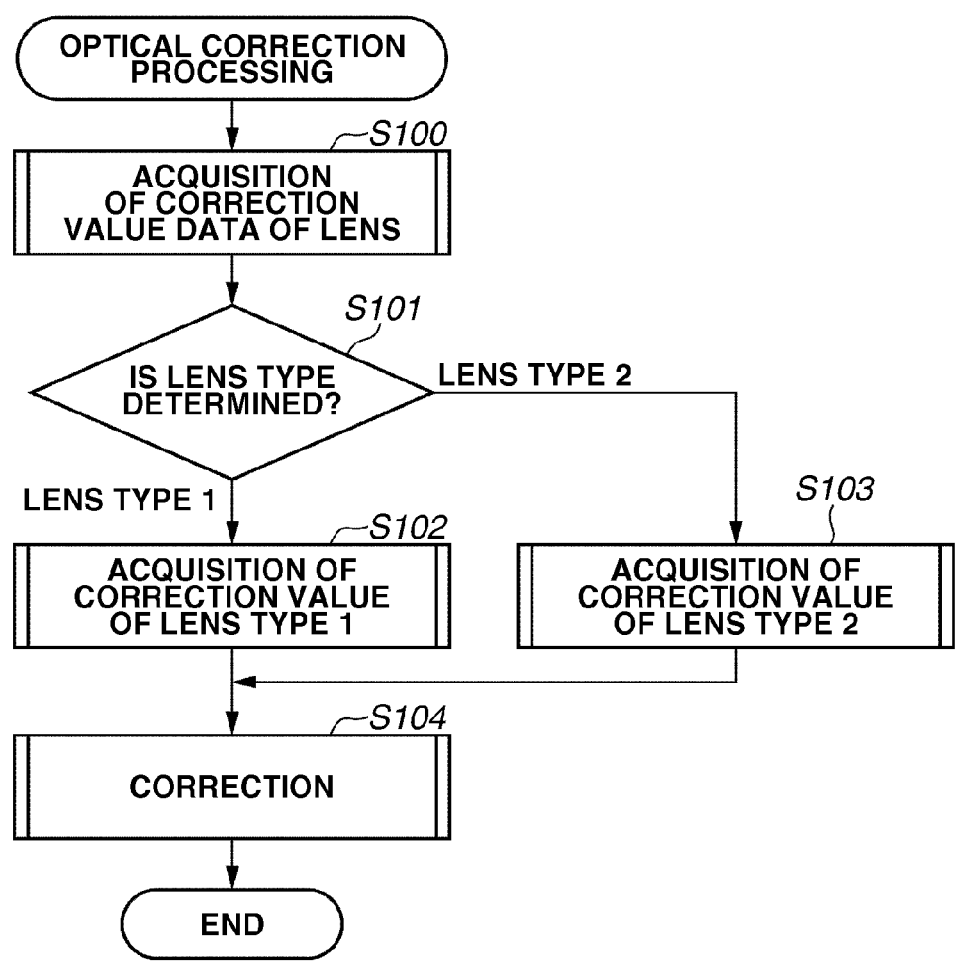
FIG. 7 is a flow chart illustrating optical correction processing according to the first exemplary embodiment of the present invention.

An optical correction processing performed by the optical correction unit 130 is described below. FIG. 7 is a flow chart illustrating the optical correction processing performed by the optical correction unit 130.

In step S100, the optical correction unit 130 acquires optical correction data including optical correction values corresponding to the interchangeable lens 100 used for imaging from a table of optical correction data stored in the memory 16. From the viewpoint of the interchangeable lens 100, this means that the stored optical correction data are transmitted. The memory 16 functions as an optical correction data storage unit.

Figure 8:
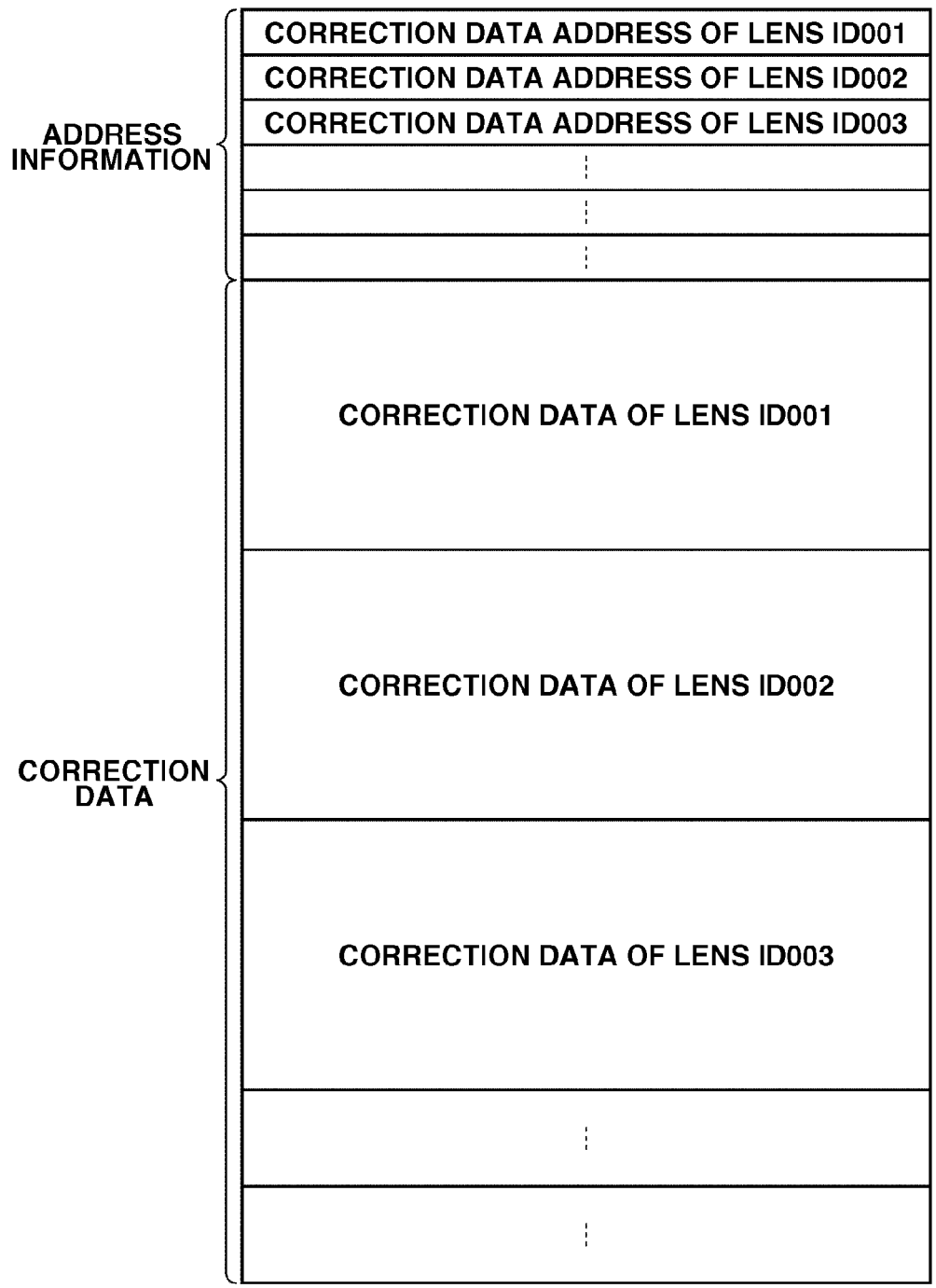
FIG. 8 illustrates an example of a structure of optical correction data stored in the memory 106 in FIG. 1.

The memory 16 stores the optical correction data table, which has a structure illustrated in FIG. 8 and stores optical correction data about a plurality of types of interchangeable lenses. An address information area in the head of the table records lens IDs being information for identifying the type of the interchangeable lens 100 and information for identifying the head address storing the corresponding optical correction data. A correction data area sequentially stores the optical correction data corresponding to each lens ID. As described below, the correction data area is structured such that an optical correction value about the interchangeable lens classified into the first interchangeable lens can be obtained from the first optical parameter and an optical correction value about the interchangeable lens classified into the second interchangeable lens can be obtained from the second optical parameter. The optical correction unit 130 searches for the ID of the interchangeable lens used for imaging in the address information area to acquire the stored optical correction data from the address acquired in the address information area.

In step S101, as described above, the optical correction unit 130 causes the processing to diverge based on results of determination of the type of the lens performed in steps S603 and S620 when the power source is turned on or the interchangeable lens 100 is interchanged. If the attached interchangeable lens 100 is the first interchangeable lens, in step S102, the optical correction unit 130 acquires an optical correction value from the correction data using the first optical parameter. If the attached interchangeable lens 100 is the second interchangeable lens, in step S103, the optical correction unit 130 acquires an optical correction value from the correction data using the second optical parameter.

Figure 9:
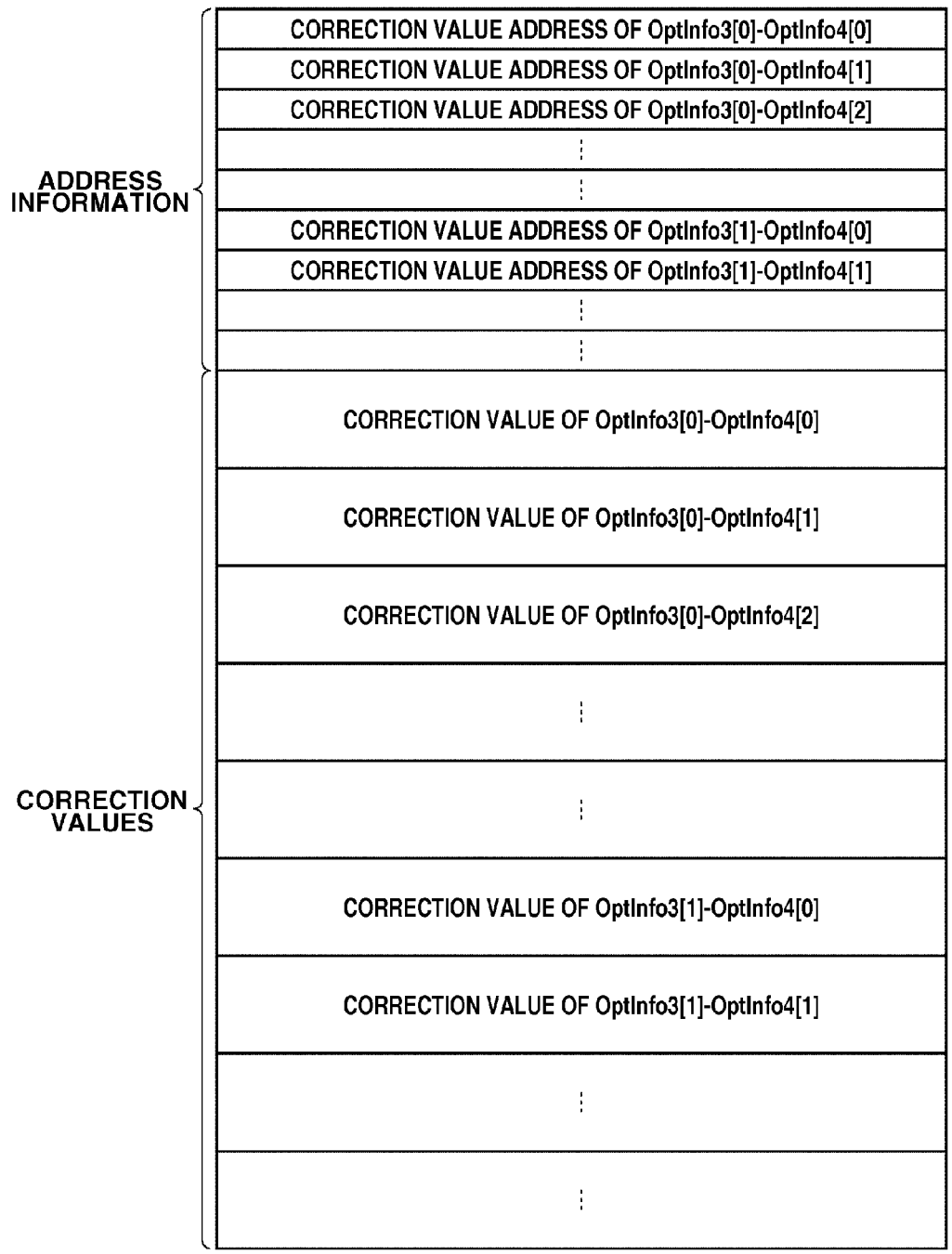
FIG. 9A illustrates an example of a structure of optical correction data stored in the memory 106 in FIG. 1.
FIG. 9B illustrates an example of a structure of optical correction data stored in the memory 106 in FIG. 1.

FIG. 9A illustrates a structure of the correction data corresponding to the first interchangeable lens. The correction data are formed of an address information area and a correction value area.

In FIG. 9A, OptInfo1[$n$], OptInfo2[$m$], and OptInfo3[$p$] (where n, m, and p are integers of 0 or more) denote the arrangement of the following optical parameters that can be taken by the interchangeable lens.

OptInfo1[$n$]: focal length information

OptInfo2[$m$]: photographing distance information, and

OptInfo3[$p$]: aperture value information.

Information about values which substantially take continuous values, such as focal length and a photographing distance, may be stored with a predetermined discrete value as an arrangement value.

For the first interchangeable lens, each of combinations of the three optical parameters and information for identifying the storage address of the optical correction value corresponding to the combination are set in the address information area. The storage address is the one in the correction value area. The optical correction value corresponding to each of the combinations of the optical parameters is sequentially stored in the correction value area.

Therefore, reference is made to the address information area using the first optical parameter used for imaging to allow acquisition of the optical correction value from the correction value area.

FIG. 9B illustrates a structure of the correction data corresponding to the second interchangeable lens. The correction data is formed of an address information area and a correction value area.

In FIG. 9B, OptInfo3[$p$] and OptInfo4[$q$] (where p and q are integers of 0 or more) denote the arrangement of the following optical parameters that can be taken by the interchangeable lens.

OptInfo3[$p$]: aperture value information and

OptInfo4[$q$]: photographing magnification information.

For the second interchangeable lens, each of combinations of the two optical parameters and information for identifying the storage address of the optical correction value corresponding to the combination are set in the address information area. The storage address is the one in the correction value area. The optical correction value corresponding to each of the combinations of the optical parameters is sequentially stored in the correction value area.

Therefore, reference is made to the address information area using the second optical parameter used for imaging to allow acquisition of the optical correction value from the correction value area.

Figure 10:
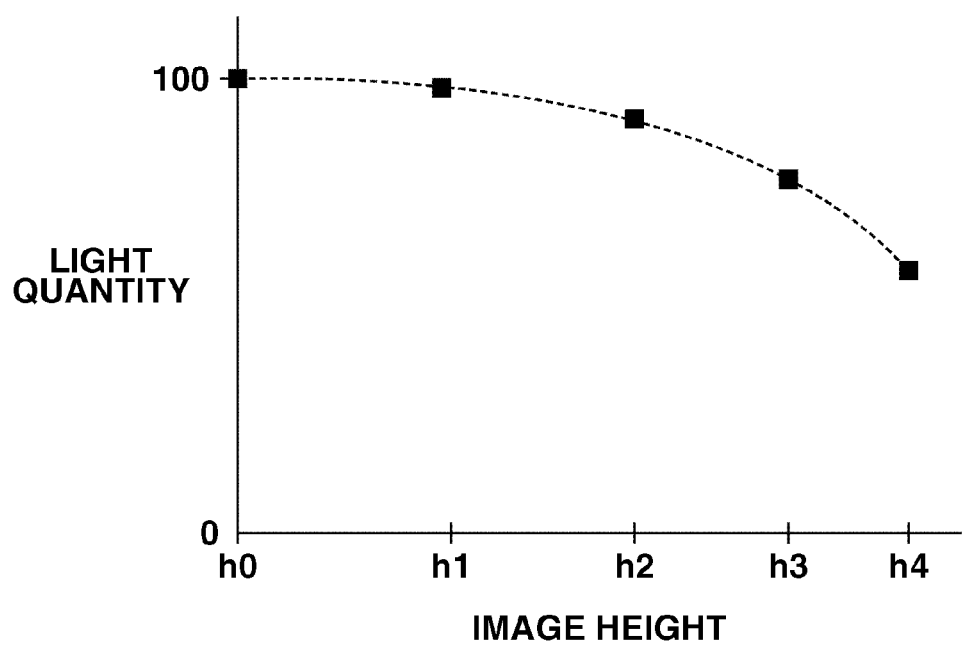
FIG. 10 illustrates an example of an optical correction value stored for each of combinations of the optical parameters.

FIG. 10 illustrates an example of the optical correction value stored for each of the combinations of the optical parameters in FIGS. 9A and 9B. Examples of correction values of light falloff at edges are illustrated here. The values of optical quantity for discrete image-heights h0 to h4 are stored as the optical correction value to reduce storage capacity. Discrete optical correction values are approximated by a polynomial expression to produce a correction curve, thereby the correction value for any image height can be obtained.

Thus, the optical correction values are stored for each combination of optical parameters required for identifying the optical correction quantity according to the lens type and lens model (ID). The optical parameters stored in the address information area may also be discretely combined, and as for the combination not stored therein, a plurality of correction values corresponding to the combination of approximate values is interpolated to allow generation of the optical correction value.

A correction method using image processing is described below with the light falloff at edges as an example. An image height being a distance from the image center in each pixel of image data to be corrected is acquired first and then light quantity corresponding to the image height is acquired from the correction curve. A gain corresponding to the reciprocal number of the light quantity is applied to a pixel value. Such processing is applied to all pixels of the image data to allow correction of the light falloff at edges.

Figure 11A:
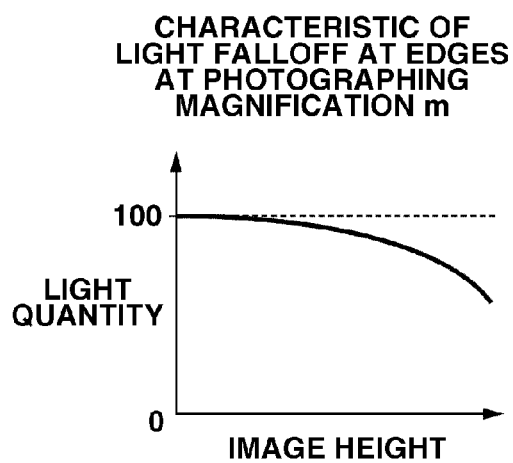
FIGS. 11A, 11B, 11C, and 11D illustrate characteristics of light falloff at edges of the macro lens with the characteristic illustrated in FIG. 2, and examples of results of correcting the light falloff at edges using the optical correction value obtained from the present exemplary embodiment.
Figure 11B:
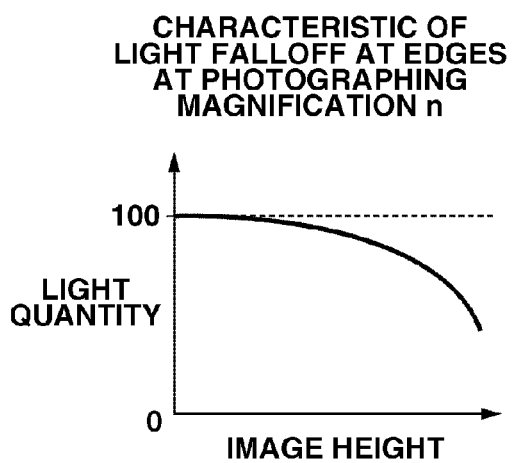

FIGS. 11A, 11B, 11C, and 11D illustrate the characteristics of light falloff at edges of the macro lens and examples of results of correction to which the method of the present exemplary embodiment is applied, similarly to FIGS. 3A, 3B, 3C, and 3D. FIGS. 11A and 11B illustrate the characteristics of light falloff at edges of the macro lens in the photographing magnifications m and n, respectively, and are similar to FIGS. 3A and 3B.

Figure 11C:
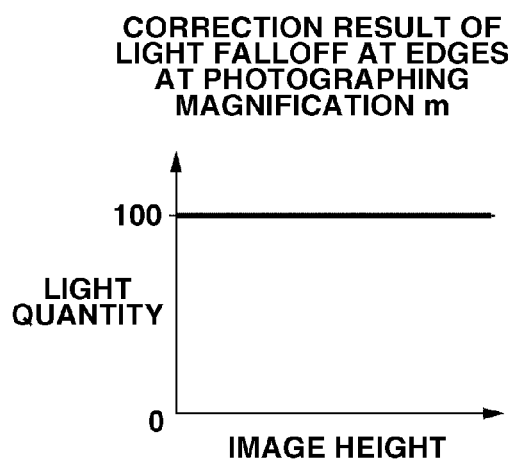
Figure 11D:
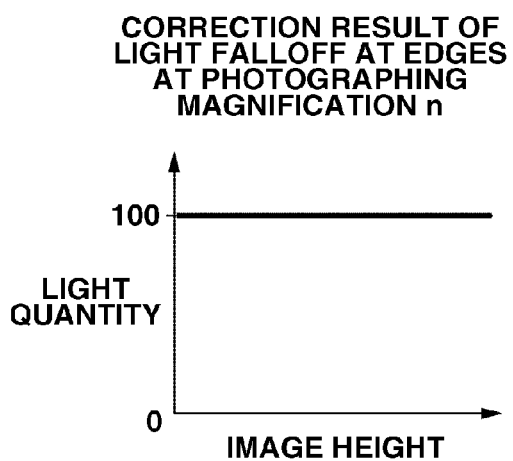

Unlike the examples of results of correction using the optical correction value identified without consideration of the photographing magnification, illustrated in FIGS. 3C and 3D, the present exemplary embodiment performs correction using the optical correction value in consideration of the photographing magnification. For this reason, as illustrated in FIGS. 11C and 11D, brightness is equal to approximately 100 in all image heights independently of the photographing magnification to enable acquisition of a high-accuracy correction image.

The method for correcting the light falloff at edges is described above as an example of an optical characteristic resulting in image degradation. However, similarly to the light falloff at edges, a basic method, in which a correction curve is formed from a discrete combination of image height and correction quantity corresponding to the combination of optical parameters and a correction value according to the image height is acquired to perform correction, is common to other optical characteristics, such as distortion aberration and chromatic aberration of magnification.

Thus, according to the present exemplary embodiment, the type of the lens unit different in the combination of optical parameters required for identifying the optical correction value is determined and the appropriate optical parameter adapted for the type of the lens unit is acquired to identify the optical correction value. For this reason, the present exemplary embodiment can realize a higher accurate optical correction than a convention technique, which acquires an optical correction value from the combination of common type of optical parameters independently of the type of the lens unit.

In the present exemplary embodiment, for the sake of simplifying description and facilitating understanding, there are described two types of lens units to be determined (or the combination of optical parameters required for identifying the optical correction value). However, the lens units and the combination of the optical parameters are not limited to two types, but the present exemplary embodiment is applicable to a larger number of types.

For example, there has been described an example, in which the present exemplary embodiment uses a macro lens as a lens unit with the second optical parameter and has information about position of a mechanism for changing a photographing magnification as the second optical parameter. However, the lens unit with the second optical parameter has not necessarily to be the macro lens and the second optical parameter may be information about position of an optical member for controlling a focal length or a photographing distance. The term "information about position of an optical member" is information about position of a mechanism for driving a lens to change a focal length or a photographing distance. The information about position of the optical member for controlling a focal length (units in mm) or a photographing distance (units in cm) acquired as the second optical parameter instead of a focal length or a photographing distance acquired as the first optical parameter may be used for identifying the optical correction value. In a system whose resolution of information about position of the optical member is higher than that of a focal length (units in mm) or a photographing distance (units in cm), the information about position of the optical member is used to realize a high-accuracy optical correction.

A second exemplary embodiment of the present invention is described below.

A basic configuration of an imaging apparatus according to the present exemplary embodiment and the terminals provided on the mount 1 are similar to those described in the first exemplary embodiment. However, the second interchangeable lens in the present exemplary embodiment is configured to transmit optical correction data from the lens to the camera. For this reason, the optical correction data is stored in the memory 104 of the second interchangeable lens. The optical correction data stored therein has a structure illustrated in FIG. 9B.

Figure 12:
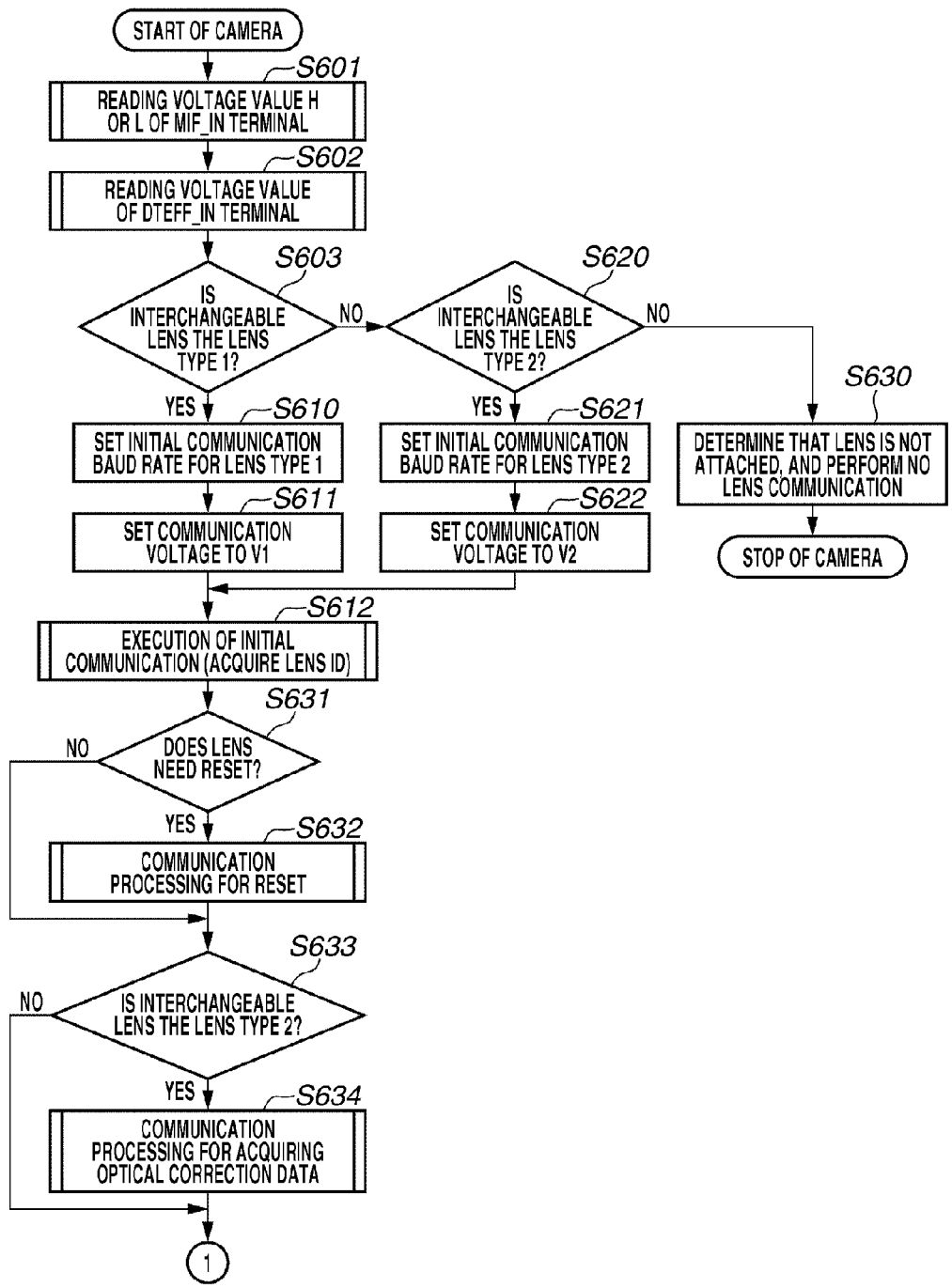
FIG. 12 is a flow chart illustrating processing for determining the type of an interchangeable lens, a communication control method for each lens type, and processing for receiving an optical parameter which are performed by a camera control unit according to a second exemplary embodiment of the present invention.

FIG. 12 is a flow chart illustrating processing for determining the type of an interchangeable lens, processing for receiving optical correction data, and processing for receiving optical parameters in shooting required for identifying the optical correction value which are performed by the camera microcomputer 20 in the camera system according to the present exemplary embodiment. The processing illustrated in FIG. 12 is performed by the camera microcomputer 20 executing programs stored in the memory 16. In FIG. 12, the steps which perform processing similar to the processing illustrated in FIG. 6 according to the first exemplary embodiment are given the same reference numerals and the description thereof is not repeated.

Although the processing illustrated in FIG. 12 is basically similar to the processing in the first exemplary embodiment, the processing in FIG. 12 is different in that the camera microcomputer 20 communicates with the interchangeable lens 100 in step S633 to acquire the optical correction data after the camera microcomputer 20 determines that the attached interchangeable lens 100 is the lens type 2 in step S603, switches the communication baud rate to an appropriate communication setting in steps S621 and S622, and executes communication in step S612. The processing transmits the optical correction data stored in the memory 104 of the interchangeable lens 100 to the camera 10 and stores the data in the memory 16 of the camera 10. The transmitted optical correction data has a data structure illustrated in FIG. 9B and is set so that the optical correction value can be identified from the first optical parameter acquired in step S661 and the second optical parameter acquired in step S663.

[Communication for Acquiring Optical Correction Data]

The camera microcomputer 20 determines whether the attached lens is the lens type 1.

If the attached lens is the lens type 2 (YES in step S633), in step S634, processing for the optical correction data acquiring communication is performed.

In step S634, when the optical correction data acquiring communication is started, in step S650, the camera microcomputer 20 checks whether there is a need for the camera 01 to acquire the optical correction data of the attached interchangeable lens 100. If the optical correction data corresponding to the attached interchangeable lens 100 is already stored in the memory 16, the processing may be omitted. This allows saving of processing time required for communication of the optical correction data if the camera 10 already has the optical data.

In this step, a determination is made as to whether the information acquired in step S612, the information stored in the memory 16, and the information about the attached lens coincide with one another. The above pieces of information include lens type information and lens name acquired in step S612, the serial number of the lens, the presence or absence of accessories such as extender, and version information for identifying the format of the optical correction data.

Communication for the optical correction data is described below with reference to FIG. 20.

In step S650, if the camera microcomputer 20 determines that the optical correction data needs to be acquired (YES in step S650), in step S651, the camera microcomputer 20 checks if the present communication system is the moving image communication system. If the present communication system is the moving image communication system (YES in step S651), in step S652, the camera microcomputer 20 switches the communication state into the still image communication system. The reason the communication state is switched from the moving image communication system into the still image communication system is that a blank period occurs between the two communications with fixed length in the moving image communication system as illustrated in FIG. 14. In other words, if optical correction data with a larger amount of data is transferred, it takes a relatively longer time due to the blank period, so that the moving image communication system is inferior to the still image communication system.

In step S653, the camera microcomputer 20 sequentially acquires the optical correction data from the lens and stores the optical correction data in the memory of storage area of the camera.

Figure 16:
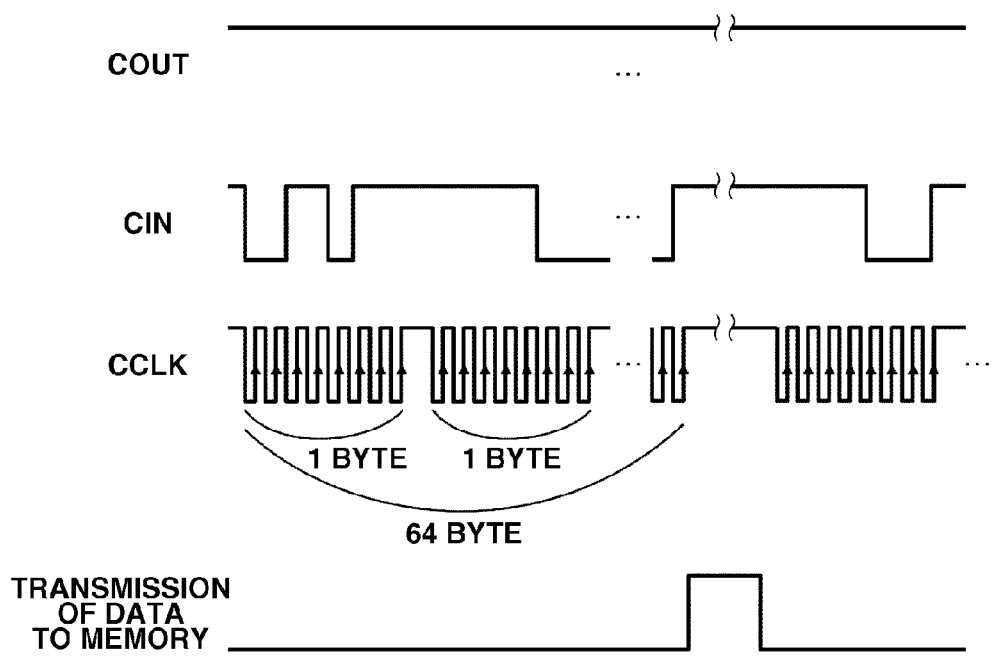
FIG. 16 illustrates methods for acquiring optical correction data according to the second exemplary embodiment of the present invention by communication and storing the data in the camera.

FIG. 16 illustrates examples of methods for acquiring the optical correction data and storing data. As described above, because data size is large like the optical correction data and all data need to be collectively acquired, it is desirable to acquire data on the still image communication. The communication processing in this step performs only data transfer and does not perform a lens drive control. Thus, both of the camera and the lens do not have to allocate the processing function of the microcomputer to communication control, or data transfer is performed by a direct memory access (DMA) function without a central processing unit (CPU). That eliminates the need for passing thorough BUSY time between the communications as illustrated in FIG. 16, allowing the speed of communication to be increased. The camera has only to output a fixed value to the communication terminal Cout because of communication whose purpose is to acquire data. The information about the optical correction data acquired at the communication terminal Cin has only to be transferred to the predetermined memory 16 each time the information is acquired. For the sake of convenience, FIG. 16 indicates that data transfer processing to the memory 16 occurs each time X-byte data is acquired. However, the communication data size does not need to be limited to X byte.

In step S653, the communication system is returned to a state suited to camera operation similarly to step S643. The reason a reference is made to the voltage value at the DTEF_IN terminal in step S602 as a determination condition in step S633 is that the camera microcomputer 20 is enabled to acquire the optical correction data forward during starting time before the initial data exchange processing is performed with the lens in step S612 if there is time to spare. The information about type of the lens in step S612 may be configured to acquire whether it is possible to communicate the optical correction data, which may be taken as determination object in step S633.

Thus, the optical correction data is acquired after the lens reset operation is executed. This is because the lens reset operation is preceded to accelerate a live view displaying an object image to executable state.

A table of the optical correction data stored in the memory 16 has a structure illustrated in FIG. 8. The optical correction data received from the interchangeable lens 100 needs to be added to the table for future reference. As described above, if the interchangeable lens 100 is detached and then attached again, the processing passes step S666 and returns to step S660 to perform repeat processing.

The optical correction data for the second interchangeable lens is acquired and the optical parameter for identifying the correction value from the acquired optical correction data is acquired through the above processing.

The optical correction processing performed by the optical correction unit 130 may be the same as that of the first exemplary embodiment. The optical correction data acquired from the second interchangeable lens are already stored in the memory 16, so that the processing illustrated in FIG. 7 is performed to allow identification of the correction value and performance of the correction processing.

As described in the present exemplary embodiment, the optical correction data is transmitted from the lens unit to the camera, stored therein, and used for identifying the optical correction value to enable appropriate optical correction even if the optical correction data corresponding to the attached lens unit is not stored in the memory 16.

In the present exemplary embodiment, the second interchangeable lens transmits the optical correction data to the camera. However, exemplary embodiments of the present invention are not limited to such an embodiment. A plurality of different types of interchangeable lenses may transmit the optical correction data to the camera. The types of the lenses transmitting the optical correction data to the camera and the combinations of optical parameters required for the types of the lenses are also not limited to those described in the present exemplary embodiment, but the exemplary embodiments of the present invention are applicable to a plurality of types and combinations.

The exemplary embodiments are described above in which the present invention is applied to the imaging apparatus with a specific configuration. The exemplary embodiments of the present invention can be modified and changed in a variety of ways without departing from the scope of the claims.

The exemplary embodiments of the present invention can provide a technique for switching to a communication system appropriate for an attached lens unit for communication between a camera and the lens unit.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-200298 filed Sep. 12, 2012, which is hereby incorporated by reference herein in its entirety.

What is claimed is:

1. An imaging apparatus, to which a lens unit with an optical member is attached and which communicates with the lens unit to transmit a control signal for the optical member, the imaging apparatus comprising:
at least one processor;
at least one memory;
a communication unit configured to communicate with the attached lens unit;
an imaging unit configured to be able to capture an object image formed by the optical member of the attached lens unit;
a lens information acquisition unit configured to acquire, via the communication unit, individual information of the attached lens unit;
a determination unit configured to determine a communication method with the attached lens unit;
and a reset instruction unit configured to instruct, via the communication unit, the attached lens unit to reset the optical member thereof,
wherein the lens information acquisition unit acquires the individual information of the attached lens unit in a first communication method which does not use a signal corresponding to an imaging timing signal of an image sensor of the imaging apparatus, thereafter the reset instruction unit instructs to reset the optical member in a second communication method which uses a signal corresponding to an imaging timing signal of an image sensor of the imaging apparatus, and thereafter the lens information acquisition unit acquires, via the communication unit, optical correction data of the attached lens unit in the first communication method,
and wherein at least one of the units is implemented upon execution of the instructions stored in the at least one memory by the at least one processor.

2. The imaging apparatus according to claim 1, wherein the first communication system does not use a signal corresponding to an imaging timing signal of an image sensor of the imaging apparatus.

3. The imaging apparatus according to claim 1, wherein the second communication system uses a signal corresponding to an imaging timing signal of an image sensor of the imaging apparatus.

4. The imaging apparatus according to claim 1, wherein, the communication with the attached lens unit, after the optical correction data is acquired, is switched to the communication not using the signal corresponding to the imaging timing signal of an image sensor of the imaging apparatus.

5. A lens unit exposing an object image on an imaging apparatus including an imaging unit capable of capturing the object image, the lens unit comprising:
at least one processor;
at least one memory;
an optical member capable of being driven;
a communication unit configured to communicate with the imaging apparatus, to which the lens unit is attached;
a memory configured to store individual information;
a setting unit configured to set a communication system with the imaging apparatus;
a reset unit configured to reset a driving of the optical member; and
an optical correction data storage unit configured to store optical correction data,
wherein the individual information stored in the memory is, via the communication unit, transmitted to the imaging apparatus in a first communication method which does not use a signal corresponding to an imaging timing signal of an image sensor of the imaging apparatus, thereafter the reset unit resets the driving of the optical member in response to an instruction via the communication unit in a second communication method which uses a signal corresponding to an imaging timing signal of an image sensor of the imaging apparatus, and thereafter the optical correction data stored in the optical correction data storage unit is, via the communication unit, transmitted in the first communication method, and
wherein at least one of the unit is implemented upon execution of the instructions stored in the at least one memory by the at least one processor.

6. The lens unit according to claim 5, wherein the first communication method does not use a signal corresponding to an imaging timing signal of an image sensor of the imaging apparatus.

7. The lens unit according to claim 5, wherein the second communication method uses a signal corresponding to an imaging timing signal of an image sensor of the imaging apparatus.

8. The lens unit according to claim 5, wherein the communication with the imaging apparatus, after the optical correction data is transmitted, is switched to the communication not using the signal corresponding to the imaging timing signal of an image sensor of the imaging apparatus.

9. The lens unit according to claim 5, wherein the individual information stored in the memory and the optical correction data are, via the communication unit, transmitted to the imaging apparatus.

10. The imaging apparatus according to claim 1, wherein the imaging apparatus performs image processing on an image with the optical correction data.

11. The lens unit according to claim 5, wherein the imaging apparatus performs image processing on an image with the optical correction data.

* * * * *